(12) United States Patent
Sekizawa

(10) Patent No.: US 11,082,325 B2
(45) Date of Patent: Aug. 3, 2021

(54) COMMUNICATION CONTROL METHOD AND INFORMATION PROCESSING APPARATUS

(71) Applicant: FUJITSU LIMITED, Kawasaki (JP)

(72) Inventor: Ryuichi Sekizawa, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/827,752

(22) Filed: Mar. 24, 2020

(65) Prior Publication Data
US 2020/0336404 A1 Oct. 22, 2020

(30) Foreign Application Priority Data

Apr. 16, 2019 (JP) .............................. JP2019-077726

(51) Int. Cl.
*G06F 15/16* (2006.01)
*H04L 12/751* (2013.01)

(52) U.S. Cl.
CPC .................................... *H04L 45/02* (2013.01)

(58) Field of Classification Search
USPC .......................................... 709/200; 370/256
See application file for complete search history.

(56) References Cited

U.S. PATENT DOCUMENTS

| | | | | |
|---|---|---|---|---|
| 8,095,600 B2 * | 1/2012 | Hasha | ...................... | H04L 45/02 709/206 |
| 2011/0149731 A1 * | 6/2011 | Gong | ................ | H04W 72/1273 370/235 |
| 2014/0059532 A1 * | 2/2014 | Hotham | .................... | G06F 8/65 717/171 |
| 2014/0173013 A1 * | 6/2014 | Liu | ......................... | H04L 61/00 709/211 |
| 2017/0149887 A1 * | 5/2017 | Tasoulas | ................ | G06F 9/5077 |
| 2018/0367462 A1 * | 12/2018 | Tang | ..................... | H04L 47/25 |
| 2019/0229949 A1 | 7/2019 | Shimizu et al. | | |

FOREIGN PATENT DOCUMENTS

| | | | |
|---|---|---|---|
| JP | 2018-026657 A | 2/2018 |
| JP | 2018-185650 A | 11/2018 |

* cited by examiner

*Primary Examiner* — Anthony Mejia
(74) *Attorney, Agent, or Firm* — Fujitsu Patent Center

(57) ABSTRACT

In a system including a plurality of nodes, a plurality of first relay devices, and a plurality of second relay devices, where each first relay device is connected to two or more second relay devices, the nodes are classified into a plurality of groups such that different nodes individually connected to different first relay devices having different sets of second relay devices connected thereto are classified into different groups. A representative node is selected from each group. Communication order of a first broadcast operation performed between the representative nodes is determined such that the number of source nodes transmitting data in parallel increases. Communication order of a second broadcast operation performed for each group after the first broadcast operation is determined such that the representative node of the group acts as a first source node and the number of source nodes transmitting the data in parallel increases.

6 Claims, 16 Drawing Sheets

PROCESS ASSIGNMENT TABLE 174

| RANK | NODE ID |
|------|---------|
| 0 | n0 |
| 1 | n9 |
| 2 | n18 |
| 3 | n27 |
| 4 | n1 |
| ... | ... |

FIG. 13

COMMUNICATION PROCEDURE STORING UNIT 172

TRANSMISSION PROCEDURE TABLE 175

| RANK | t1 | t2 | t3 | t4 | t5 |
|---|---|---|---|---|---|
| 0 | 1 | 2 | 4 | 8 | 16 |
| 1 | −1 | 3 | 5 | 9 | 17 |
| 2 | −1 | −1 | 6 | 10 | 18 |
| 3 | −1 | −1 | 7 | 11 | 19 |
| 4 | −1 | −1 | −1 | 12 | 20 |
| ... | ... | ... | ... | ... | ... |

RECEPTION PROCEDURE TABLE 176

| RANK | t1 | t2 | t3 | t4 | t5 |
|---|---|---|---|---|---|
| 0 | −1 | −1 | −1 | −1 | −1 |
| 1 | 0 | −1 | −1 | −1 | −1 |
| 2 | −1 | 0 | −1 | −1 | −1 |
| 3 | −1 | 1 | −1 | −1 | −1 |
| 4 | −1 | −1 | 0 | −1 | −1 |
| ... | ... | ... | ... | ... | ... |

FIG. 14

COMMUNICATION CONTROL METHOD AND INFORMATION PROCESSING APPARATUS

CROSS-REFERENCE TO RELATED APPLICATION

This application is based upon and claims the benefit of priority of the prior Japanese Patent Application No. 2019-077726, filed on Apr. 16, 2019, the entire contents of which are incorporated herein by reference.

FIELD

The embodiments discussed herein are related to a communication control method and information processing apparatus.

BACKGROUND

There are parallel processing systems including a plurality of information processing apparatuses as nodes. The parallel processing systems assign a plurality of processes belonging to the same job to the multiple nodes, which then run the assigned processes in parallel. During the job, communication may take place between the nodes. User programs establishing internode communication are sometimes implemented using a communication library such as Message Passing Interface (MPI). As internode communication, collective communication (also termed group communication) is known, in which a plurality of nodes engaged in a job simultaneously participates in data transmission. There are various collective communication routines including 'broadcast' in which the same data is copied from a single node to a plurality of different nodes.

Note that in the case where a parallel processing system includes a large number of nodes, it is difficult to connect all the nodes directly to a single relay device, such as a single switch. Therefore, what is important is a network topology (sometimes simply termed topology) which represents the interconnection between a plurality of nodes and a plurality of relay devices. Communication between a single node and another node may be realized via two or more relay devices. In some cases, the selection of a topology for a parallel processing system takes into account redundancy in internode communication paths and cost dependent, for example, on the number of replay devices.

A multi-layer full mesh system with a multi-layer full mesh topology has been proposed as one type of parallel processing system. The proposed multi-layer full mesh system includes a plurality of nodes, a plurality of leaf switches, and a plurality of spine switches, and forms a plurality of layers. Each node is connected to one of the leaf switches, each of which belongs to one of the layers, and each spine switch penetrates the multiple layers.

In each layer, two or more leaf switches are connected to each other in a full mesh topology. For every pair of leaf switches, there is a communication path not running through a different leaf switch. Note however that, for every pair of leaf switches, a single spine switch is provided therebetween. Therefore, within each layer, a single leaf switch communicates with a different leaf switch via a spine switch, which connects the multiple layers. Hence, the single leaf switch is also able to communicate with a leaf switch belonging to a different layer via the spine switch.

There is a proposed data distribution system for distributing data from a single transmitting terminal to a plurality of receiving terminals using a plurality of relay devices connected in a tree structure. The proposed data distribution system transfers attribute information of individual receiving terminals along a tree from leaves of the tree to its root to thereby aggregate the attribute information into the transmitting terminal. Upon the transmitting terminal outputting a packet designating an attribute condition, each relay device transfers the packet in the directions toward receiving terminals satisfying the attribute condition.

See, for example, the following documents:
Japanese Laid-open Patent Publication No. 2018-26657; and
Japanese Laid-open Patent Publication No. 2018-185650.

Some broadcast algorithms allow each node receiving data copied from a starting node to then act as a source node thereafter, thus increasing the number of nodes transmitting the data in parallel. For example, a binomial tree algorithm is known as an algorithm for a broadcast operation. According to the binomial tree algorithm, Process 0 transmits data to Process 1 in the first phase, and then in the second phase, Process 0 transmits the data to Process 2, in parallel with which Process 1 transmits the received data to Process 3. In this manner, the number of source nodes doubles in every phase.

However, there remains a problem that some topologies for parallel processing systems have an increased chance of causing communication conflicts when a large number of nodes transmit data simultaneously in a broadcast operation. In the case where Process 0 transmits data to Process 2, in parallel with which Process 1 transmits data to Process 3, a communication conflict may arise if the two communication paths use the same link. The communication conflict results in communication delay due to, for example, queued packets waiting for transmission and division of the communication band of one link, thus increasing communication time.

For example, in the aforementioned multi-layer full mesh system, the number of shortest paths between two leaf switches corresponds to the number of spine switches commonly connected to the two leaf switches. Only one shortest path exists between two leaf switches belonging to the same layer. Therefore, in the case where Processes 0 and 1 are under one leaf switch while Processes 2 and 3 are under a different leaf switch, communication from Process 0 to Process 2 may conflict with communication from Process 1 to Process 3.

SUMMARY

According to one embodiment, there is provided a non-transitory computer-readable recording medium storing therein a computer program that causes a computer to execute a process including classifying, in a system including a plurality of nodes, a plurality of first relay devices, and a plurality of second relay devices, where each of the plurality of nodes is connected to one of the plurality of first relay devices and each of the plurality of first relay devices is connected to two or more second relay devices from among the plurality of second relay devices, the plurality of nodes into a plurality of groups such that different nodes individually connected to different first relay devices having different sets of the two or more second relay devices connected thereto are classified into different groups; selecting a representative node from each of the plurality of groups; determining communication order of a first broadcast operation performed between the representative nodes corresponding to the plurality of groups such that one of the representative nodes acts as a first source node and each remaining representative node other than the first source node after receiving data acts as a source node thereafter, to increase a number of source nodes transmitting the data in parallel; and determining, with respect to each of the plurality of groups, communication order of a second broadcast operation performed between two or more nodes included in the each of the plurality of groups after the first broadcast operation such that the representative node of the each of the plurality of groups acts as a first source node and each remaining node other than the first source node included in the each of the plurality of groups, after receiving the data, acts as a source node thereafter, to increase a number of source nodes transmitting the data in parallel.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates an exemplary process assignment table;

FIG. 14 illustrates exemplary communication procedure tables;

DESCRIPTION OF EMBODIMENTS

Several embodiments will be described below with reference to the accompanying drawings.

(a) First Embodiment

A first embodiment is described hereinafter.

Figure 1:
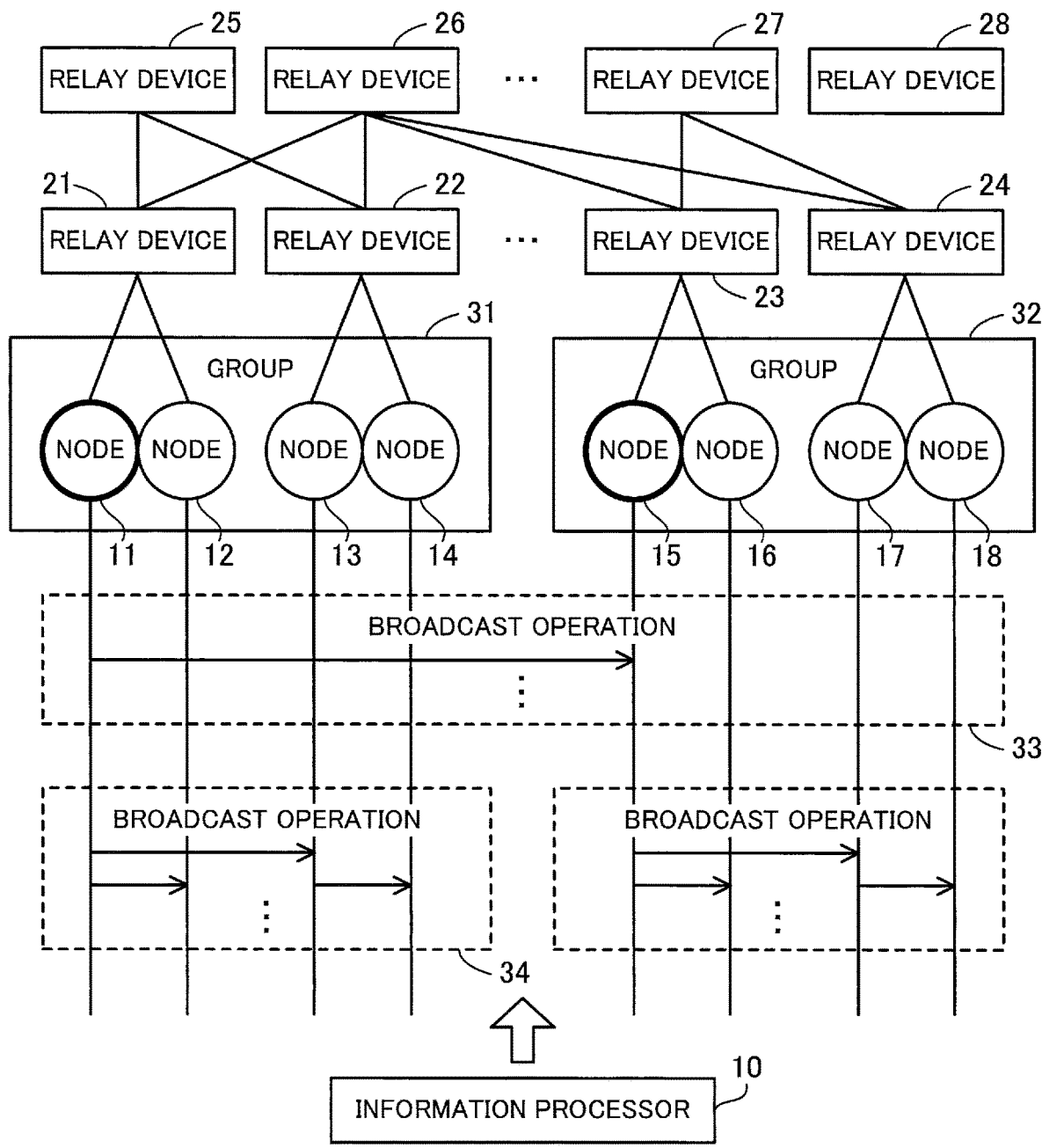
FIG. 1 illustrates an exemplary information processing system according to a first embodiment.

FIG. 1 illustrates an exemplary information processing system according to the first embodiment.

The information processing system according to the first embodiment controls a broadcast operation among a plurality of nodes conducting parallel information processing. The system here concerned (referred to hereinafter as the "target system"), conducting the broadcast operation, is, for example, a multi-layer full mesh system with a multi-layer full mesh topology. Note however that the target system is not limited to a multi-layer full mesh system if it has a configuration described below.

The information processing system of the first embodiment includes an information processor 10. The information processor 10 may be a control device such as a job scheduler for controlling the target system which performs broadcast operation, or one of the nodes included in the target system.

The information processor 10 includes a storing unit and a processing unit. The storing unit may be volatile memory such as random access memory (RAM), or a non-volatile storage device such as a hard disk drive (HDD) or flash memory. The processing unit is, for example, a processor such as a central processing unit (CPU), graphics processing unit (GPU), or digital signal processor (DSP). Note however that, the processing unit may include an electronic circuit designed for specific use, such as an application specific integrated circuit (ASIC) or a field programmable gate array (FPGA). The processor executes programs stored in memory. The term "multiprocessor", or simply "processor", may be used to refer to a set of multiple processors.

The target system conducting broadcast operation has a plurality of nodes including nodes 11, 12, 13, 14, 15, 16, 17, and 18. The target system also has a plurality of relay devices including relay devices 21, 22, 23, 24, 25, 26, 27, and 28. The relay devices 21, 22, 23, and 24 are lower-level relay devices (first relay devices). The relay devices 25, 26, 27, and 28 are higher-level relay devices (second relay devices). The relay devices 21, 22, 23, 24, 25, 26, 27, and 28 transfer data according to their connection relationship.

Each of the multiple nodes is connected to one of the multiple first relay devices. Each of the first relay devices is connected to two or more second relay devices amongst the multiple second relay devices. In the example of FIG. 1, the nodes 11 and 12 are connected to the relay device 21, the nodes 13 and 14 are connected to the relay device 22, the nodes 15 and 16 are connected to the relay device 23, and the nodes 17 and 18 are connected to the relay device 24. The relay device 21 is connected to the relay devices 25 and 26, the relay device 22 is connected to the relay devices 25 and 26, the relay device 23 is connected to the relay devices 26 and 27, and the relay device 24 is connected to the relay devices 26 and 27.

In regard to broadcast operation run on the target system, the information processor 10 determines communication order among the multiple nodes. The broadcast operation is carried out, for example, in a plurality of phases. During one phase, two or more nodes may transmit data in parallel. In determining the order of the broadcast operation, for example, which nodes act as sender nodes in each phase are determined.

First, the information processor 10 classifies the multiple nodes included in the target system into a plurality of groups. At this time, the information processor 1C classifies the multiple first relay devices into a plurality of groups based on the sameness of two or more second relay devices connected to each of the first relay devices. The grouping is done such that first relay devices having different sets of two or more second relay devices connected thereto are split into different groups. Then, the information processor 10 determines nodes connected to first relay devices put into one group as nodes belonging to the group. Each node belongs to one of the groups.

In the example of FIG. 1, both the relay devices 21 and 22 are individually connected to the higher-level relay devices 25 and 26. Similarly, both the relay devices 23 and 24 are individually connected to the higher-level relay devices 26 and 27. In this case, the relay devices 21 and 22 may be put into the same group. Similarly, the relay devices 23 and 24 may be put into the same group. On the other hand, the relay device 21 and the relay devices 23 and 24 are separated into different groups. In addition, the relay device 22 and the relay devices 23 and 24 are separated into different groups.

In this example, the information processor 10 classifies the nodes 11 and 12 connected to the relay device 21 and the nodes 13 and 14 connected to the relay device 22 into a group 31. The information processor 10 also classifies the nodes 15 and 16 connected to the relay device 23 and the nodes 17 and 18 connected to the relay device 24 into a group 32. Note however that it is allowed to put the nodes 11 and 12 and the nodes 13 and 14 into different groups. Similarly, it is allowed to put the nodes 15 and 16 and the nodes 17 and 18 into different groups.

Subsequently, the information processor 10 selects a representative node from each of the created groups. In this regard, simply one node needs to be selected as a representative node from each group, and a selection criterion of some sort may be predefined. For example, the information processor 10 selects, amongst two or more nodes of each group, a node assigned a process having the lowest identification number. In the example of FIG. 1, the information processor 10 selects the node 11 as a representative node from the group 31. In addition, the information processor 10 selects the node 15 as a representative node from the group 32.

Next, the information processor 10 determines communication order of a broadcast operation 33 (a first broadcast operation) conducted among the multiple representative nodes corresponding to the created groups. In addition, with respect to each of the groups, the information processor 10 determines communication order of a broadcast operation 34 (a second broadcast operation) conducted, after the broadcast operation 33, among the two or more nodes included in the group.

The broadcast operation 33 and the broadcast operation 34 are individually carried out as part of the whole broadcast operation while being distinguished from one another as different stages. The broadcast operation 33 is intergroup communication while the broadcast operation 34 is intragroup communication. In the broadcast operation 33, only the single representative node of each group participates in the communication. The broadcast operations 34 of the multiple groups may be performed in parallel.

The information processor 10 determines the communication order among the representative nodes corresponding to the multiple groups such that the broadcast operation 33 satisfies the following conditions. Among the multiple representative nodes, one representative node acts as a first source node. Then, each remaining representative node after receiving data acts as a source node thereafter, thus increasing the number of source nodes transmitting the data in parallel. For example, the number of source nodes transmitting the data in parallel doubles in every phase. The communication order of the broadcast operation 33 determined here may be based on a binomial tree algorithm.

In addition, the information processor 10 determines the communication order among two or more nodes of each group such that the broadcast operation 34 satisfies the following conditions. Among the two or more nodes of the group, the representative node acts as a first source node. To the representative node, data has been copied by the aforementioned broadcast operation 33. Then, each remaining node of the group after receiving the data acts as a source node thereafter, thus increasing the number of source nodes transmitting the data in parallel. For example, the number of source nodes transmitting the data in parallel doubles in every phase. The communication order of the broadcast operation 34 determined here may be based on a binomial tree algorithm, as in the case of the broadcast operation 33.

The information processor 10 joins the communication order of the broadcast operation 33 and that of the broadcast operation 34 together to determine a communication procedure of the whole broadcast operation. The information processor 10 generates and then stores communication control information indicating the determined communication procedure. If the information processor 10 is one of the nodes, it may perform a broadcast operation by reference to the generated communication control information. If the information processor 1C is a control device, it may distribute the generated communication control information to the nodes.

According to the information processing system of the first embodiment, the nodes are classified into groups such that different nodes individually connected to different lower-level relay devices having different sets of higher-level relay devices connected thereto are separated into different groups, and a representative node is selected for each of the groups. Then, the whole broadcast operation is performed in two stages, a broadcast operation among the representative nodes and a broadcast operation within each group. For each of these stages, the communication order is determined according to an algorithm that increases the number of source nodes transmitting data in parallel in a phased manner.

In each of the broadcast operation among the representative nodes and the broadcast operation within each group, data transmission of different pairs of nodes is performed in parallel, thereby speeding up the broadcast operation. In addition, in the aforementioned intragroup communication, redundancy in communication paths is provided between the lower-level relay devices and the higher-level relay devices, thereby reducing communication conflicts. As for the aforementioned intergroup communication, because just one node from each group participates in the communication, communication conflicts are restrained even if redundancy in intergroup communication paths is low. As a result, it is possible to take control of communication conflicts throughout the whole broadcast operation, which prevents communication delay and thus shortens communication time.

(b) Second Embodiment

Next described is a second embodiment.

Figure 2:
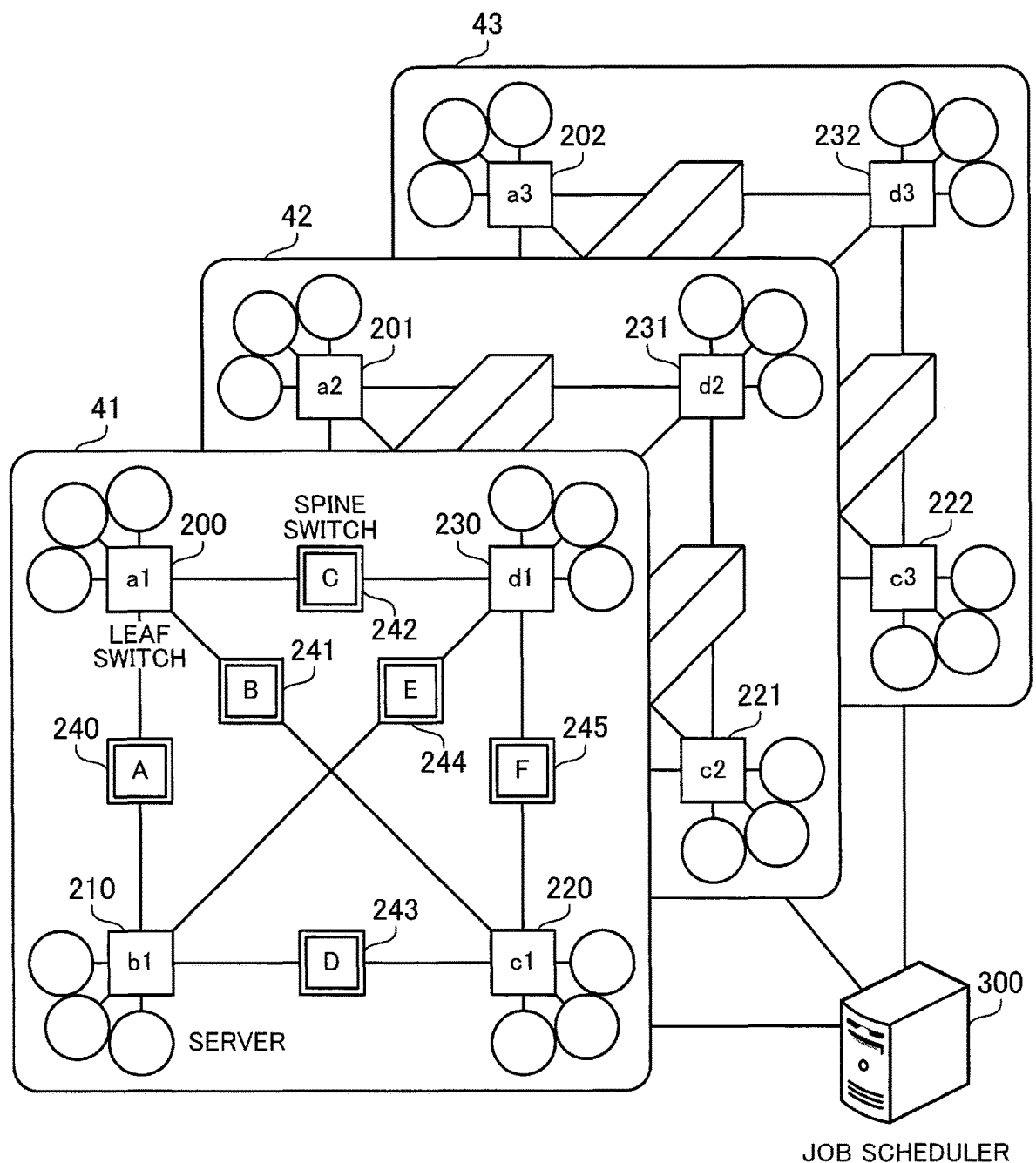
FIG. 2 illustrates an exemplary multi-layer full mesh system according to a second embodiment.

FIG. 2 illustrates an exemplary multi-layer full mesh system according to the second embodiment.

The multi-layer full mesh system according to the second embodiment includes a plurality of servers and a plurality of switches, and forms a parallel processing system in which the multiple servers and switches are connected in a multi-layer full mesh topology. The servers are nodes capable of executing user programs and may be deemed as computers or information processors.

The switches are communication devices for relaying data transmitted between the servers. The switches are classified into leaf switches and spine switches, as described below. The leaf and spine switches may have the same hardware configuration. Assume in the second embodiment that the number of ports on each switch is six for ease of explanation. Note however that the number of ports per switch may be an even number greater than 6, such as 8, 10, or 36.

The multi-layer full mesh system forms a plurality of layers. Each server is connected to one of the leaf switches. Each leaf switch belongs to one of the layers. Each spine switch penetrates the multiple layers and is connected to leaf switches of the multiple layers.

In each layer, a plurality of leaf switches forms a full mesh topology. Therefore, each pair of leaf switches has the shortest path without passing through a different leaf switch. Between every two leaf switches, a spine switch penetrating the multiple layers is provided. Therefore, two leaf switches belonging to the same layer are able to communicate with each other through a communication path via one spine switch. Further, two leaf switches belonging to different layers are also able to communicate with each other through a communication path via one spine switch. Each leaf switch is configured to transfer data over the shortest path according to its destination.

According to the second embodiment where the number of ports is six, the multi-layer full mesh system forms three layers. Each layer includes four leaf switches. To each leaf switch, three servers and three spine switches are connected. To each spine switch, two leaf switches are connected on each layer, and thus six leaf switches in total are connected for all the three layers. The multi-layer full mesh system includes six spine switches.

In general, when switches with the number of ports being p (p is an even number greater than or equal to 6) are used, a multi-layer full mesh system forms p/2 layers. Each layer forms a p/2+1 polygon with p/2+1 leaf switches. The multi-layer full mesh system includes $p^2(p+2)/S$ servers and $3p(p+2)/8$ switches. In the case of p=8, the multi-layer full mesh system forms four pentagonal layers and includes 80 servers and 30 switches. In the case of p=10, the multi-layer full mesh system forms five hexagonal layers and includes 150 servers and 45 switches. In the case of p=36, the multi-layer full mesh system forms 18 nonadecagonal (19-gonal) layers and includes 6156 servers and 513 switches.

The multi-layer full mesh system of the second embodiment forms layers 41, 42, and 43. The layer 41 includes leaf switches 200, 210, 220, and 230. Three servers are connected to each of the leaf switches 200, 210, 220, and 230.

Between the leaf switches 200 and 210, a spine switch 240 is provided. Between the leaf switches 200 and 220, a spine switch 241 is provided. Between the leaf switches 200 and 230, a spine switch 242 is provided. Between the leaf switches 210 and 220, a spine switch 243 is provided. Between the leaf switches 210 and 230, a spine switch 244 is provided. Between the leaf switches 220 and 230, a spine switch 245 is provided.

Each of the layers 42 and 43 also includes leaf switches corresponding to the leaf switches 200, 210, 220, and 230. The spine switches 240, 241, 242, 243, 244, and 245 penetrate the layers 41, 42, and 43 and are common among the layers 41, 42, and 43.

For example, the layer 42 includes leaf switches 201, 221, and 231 corresponding to the leaf switches 200, 220, and 230, respectively. On the layer 42, the spine switch 242 is provided between the leaf switches 201 and 231. The spine switch 245 is provided between the leaf switches 221 and 231. The layer 43 includes leaf switches 202, 222, and 232. On the layer 43, the spine switch 242 is provided between the leaf switches 202 and 232. The spine switch 245 is provided between the leaf switches 222 and 232.

The multi-layer full mesh system of the second embodiment also includes a job scheduler 300. The job scheduler 300 is a server device for receiving a job request from the user and selecting servers (nodes) to engage in the job. The job scheduler 300 may be deemed as a computer or information processor. The job includes a plurality of processes run from a user program. The user program may use a communication library such as MPI. The multiple processes are identified using ranks which are non-negative integer identification numbers. One server is assigned one process. The job scheduler 300 determines process allocation and notifies the servers of information on the process allocation.

Communication between the job scheduler 300 and the servers may use a data network including the aforementioned leaf and spine switches, or a management network different from the data network.

Figure 3:
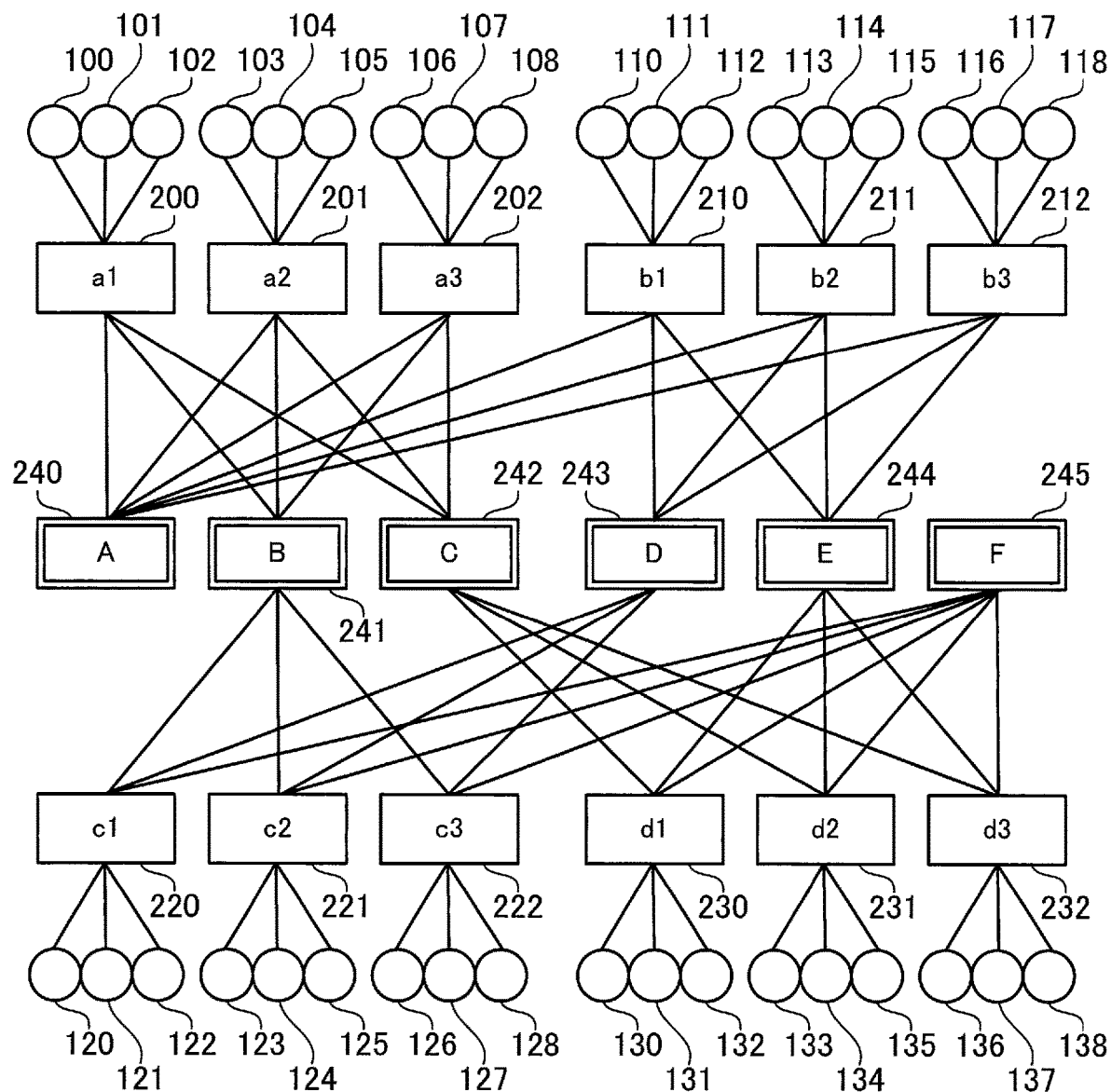
FIG. 3 illustrates exemplary wiring of the multi-layer full mesh system.

FIG. 3 illustrates exemplary wiring of a multi-layer full mesh system.

FIG. 3 represents wiring between the servers, the leaf switches, and the spine switches included in the multi-layer full mesh system of FIG. 2, in a format different from that illustrated in FIG. 2.

The multi-layer full mesh system includes the spine switches 240, 241, 242, 243, 244, and 245 (Spine Switches A, B, C, D, E, and F).

The multi-layer full mesh system also includes the leaf switches 200, 201, and 202 (Leaf Switches a1, a2, and a3). Each of the leaf switches 200, 201, and 202 is connected to three spine switches, namely the spine switches 240, 241, and 242. To the leaf switch 200, servers 100, 101, and 102 are connected. Similarly, servers 103, 104, and 105 are connected to the leaf switch 201, and servers 106, 107, and 108 are connected to the leaf switch 202.

In addition, the multi-layer full mesh system includes leaf switches 210, 211, and 212 (Leaf Switches b1, b2, and b3). Each of the leaf switches 210, 211, and 212 is connected to three spine switches, namely the spine switches 240, 243, and 244. To the leaf switch 210, servers 110, 111, and 112 are connected. Similarly, servers 113, 114, and 115 are connected to the leaf switch 211, and servers 116, 117, and 118 are connected to the leaf switch 212.

In addition, the multi-layer full mesh system includes leaf switches 220, 221, and 222 (Leaf Switches c1, c2, and c3). Each of the leaf switches 220, 221, and 222 is connected to three spine switches, namely the spine switches 241, 243, and 245. To the leaf switch 220, servers 120, 121, and 122 are connected. Similarly, servers 123, 124, and 125 are connected to the leaf switch 221, and servers 126, 127, and 128 are connected to the leaf switch 222.

Further, the multi-layer full mesh system includes leaf switches 230, 231, and 232 (Leaf Switches d1, d2, and d3). Each of the leaf switches 230, 231, and 232 is connected to three spine switches, namely the spine switches 242, 244, and 245. To the leaf switch 230, servers 130, 131, and 132 are connected. Similarly, servers 133, 134, and 135 are connected to the leaf switch 231, and servers 136, 137, and 138 are connected to the leaf switch 232.

As described above, each leaf switch has, as higher-level switches, three spine switches connected thereto. Leaf switches provided, on the layers 41, 42, and 43, at positions corresponding to each other are connected to the same spine switches. In the second embodiment, leaf switches having the exact same set of three spine switches connected thereto and their subordinate servers are sometimes referred to collectively as an "interlayer group" or simply "group".

The leaf switches 200, 201, and 202 and their subordinate servers 100, 101, 102, 103, 104, 105, 106, 107, and 108 form one group (Group a). The leaf switches 210, 211, and 212 and their subordinate servers 110, 111, 112, 113, 114, 115, 116, 117, and 118 form one group (Group b). The leaf switches 220, 221, and 222 and their subordinate servers 120, 121, 122, 123, 124, 125, 126, 127, and 128 form one group (Group c). The leaf switches 230, 231, and 232 and their subordinate servers 130, 131, 132, 133, 134, 135, 136, 137, and 138 form one group (Group d).

Figure 4:
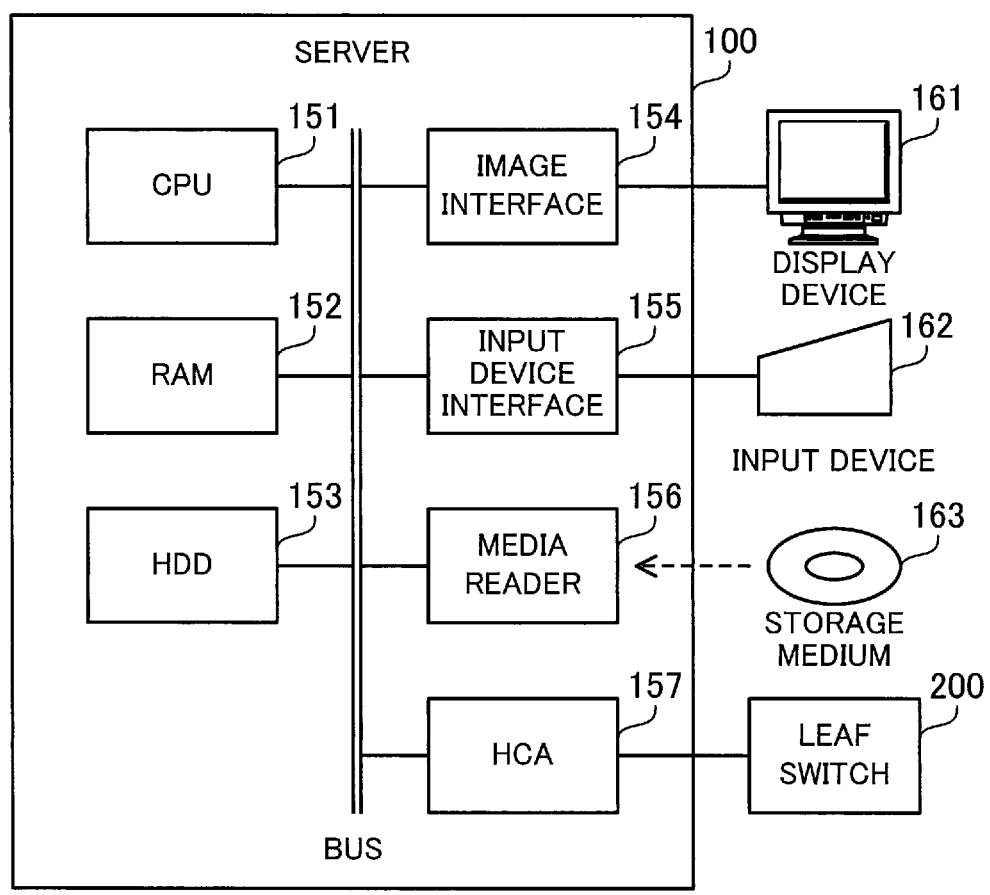
FIG. 4 is a block diagram illustrating an exemplary hardware configuration of a server.

FIG. 4 is a block diagram illustrating an exemplary hardware configuration of a server.

The server 100 includes a CPU 151, a RAM 152, an HDD 153, an image interface 154, an input device interface 155, a media reader 156, and a host channel adapter (HCA) 157. These units are individually connected to a bus. Other servers and the job scheduler 300 have the same hardware configuration as the server 100.

The CPU 151 is a processor configured to execute program instructions. The CPU 151 reads out at least part of programs and data stored in the HDD 153, loads them into the RAM 152, and executes the loaded programs. Note that the CPU 151 may include two or more processor cores and the server 100 may include two or more processors. The term "multiprocessor", or simply "processor", may be used to refer to a set of processors.

The RAM 152 is volatile semiconductor memory for temporarily storing therein programs to be executed by the CPU 151 and data to be used by the CPU 151 for its computation. Note that the server 100 may be provided with a different type of memory other than RAM, or may be provided with two or more memory devices.

The HDD 153 is a non-volatile storage device to store therein software programs, such as an operating system (OS), middleware, and application software, and various types of data. Note that the server 100 may be provided with a different type of storage device, such as flash memory or a solid state drive (SSD), or may be provided with two or more storage devices.

The image interface 154 produces video images in accordance with drawing commands from the CPU 151 and displays them on a screen of a display device 161 coupled to the server 100. The display device 161 may be any type of display, such as a cathode ray tube (CRT) display; a liquid crystal display (LCD); an organic electro-luminescence (OEL) display, or a projector. In addition, an output device, such as a printer, other than the display device 161 may also be connected to the server 100.

The input device interface 155 receives an input signal from an input device 162 connected to the server 100. Various types of input devices may be used as the input device 162, for example, a mouse, a touch panel, a touchpad, or a keyboard. A plurality of types of input devices may be connected to the server 100.

The media reader 156 is a device for reading programs and data recorded on a storage medium 163. Various types of storage media may be used as the storage medium 163, for example, a magnetic disk such as a flexible disk (FD) or an HDD, an optical disk such as a compact disc (CD) or a digital versatile disc (DVD), and semiconductor memory. The media reader 156 copies the programs and data read out from the storage medium 163 to a different storage medium, for example, the RAM 152 or the HDD 153. The read programs are executed, for example, by the CPU 151. Note that the storage medium 163 may be a portable storage medium and used to distribute the programs and data. In addition, the storage medium 163 and the HDD 153 are sometimes referred to as computer-readable storage media.

The HCA 157 is an InfiniBand communication interface. The HCA 157 supports full-duplex communication and is able to concurrently process data transmission and reception. The HCA 157 is connected to the leaf switch 200. Note however that the server 100 may be provided with a communication interface using a different communication standard in place of or in addition to the HCA 157.

Figure 5:
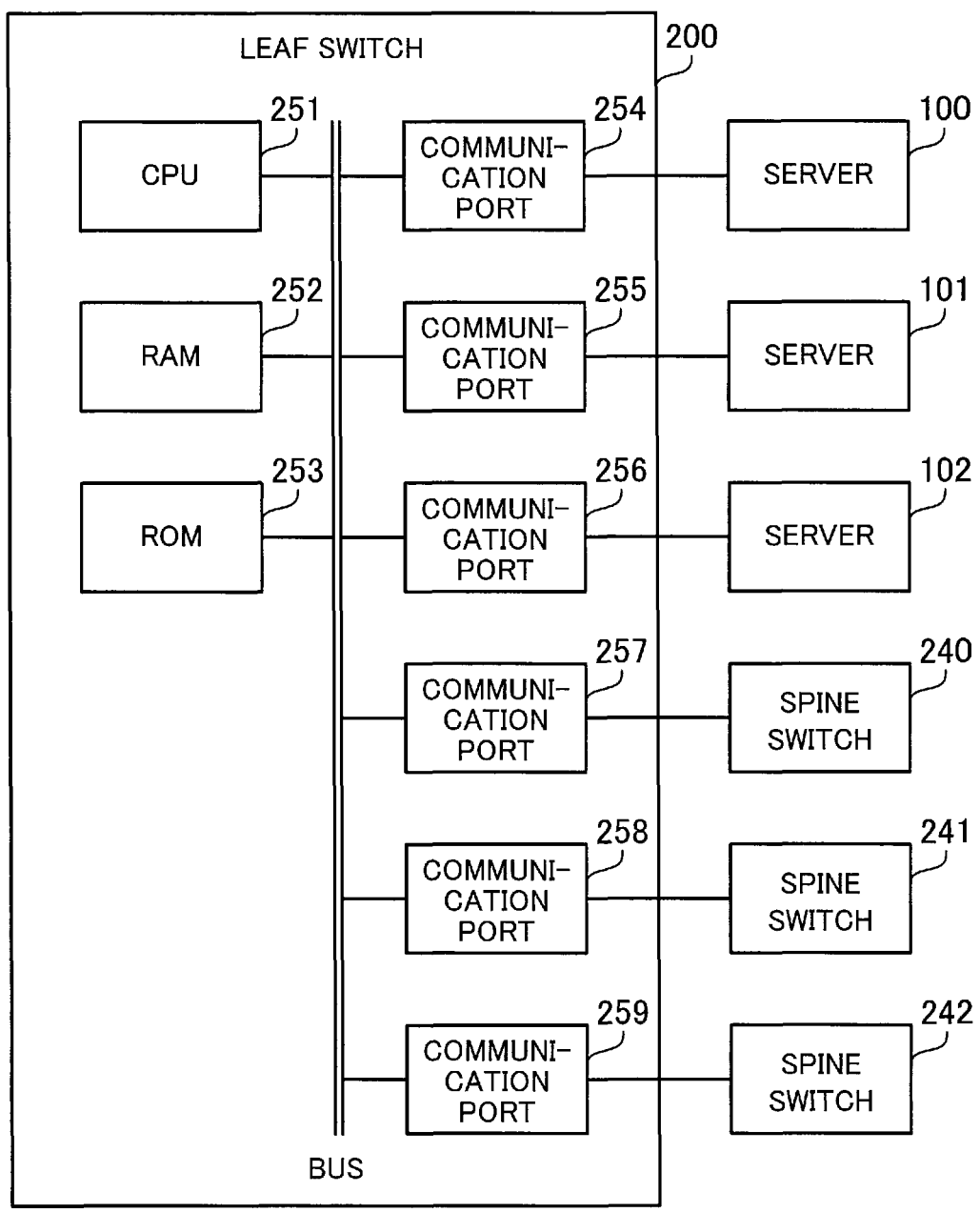
FIG. 5 is a block diagram illustrating an exemplary hardware configuration of a switch.

FIG. 5 is a block diagram illustrating an exemplary hardware configuration of a switch.

The leaf switch 200 includes a CPU 251, a RAM 252, a read-only memory (ROM) 253, and communication ports 254, 255, 256, 257, 258, and 259. Other leaf switches and spine switches have the same hardware configuration as the leaf switch 200.

The CPU 251 is a processor configured to execute a communication control program. According to the communication control program, the CPU 251 sends out a received packet to a communication port appropriate for a destination of the packet. The CPU 251 reads out at least part of the communication control program stored in the ROM 253, loads it into the RAM 252, and executes the loaded communication control program. Note however that at least part of communication control may be implemented using a dedicated hardware circuit.

The RAM 252 is volatile semiconductor memory for temporarily storing therein the communication control program to be executed by the CPU 251 and data to be used for communication control. The data includes routing information indicating mappings between packet destinations and output communication ports. The ROM 253 is a non-volatile storage device to store therein the communication control program. Note however that the leaf switch 200 may be equipped with a rewritable non-volatile storage device such as flash memory.

The communication ports 254, 255, 256, 257, 258, and 259 are InfiniBand communication interfaces. Each of the communication ports 254, 255, 256, 257, 258, and 259 supports full-duplex communication and is able to concurrently process data transmission and reception. The communication port 254 is connected to the server 100. The communication port 255 is connected to the server 101. The communication port 256 is connected to the server 102. The communication port 257 is connected to the spine switch 240. The communication port 258 is connected to the spine switch 241. The communication port 259 is connected to the spine switch 242. Note however that the leaf switch 200 may be provided with communication interfaces using a different communication standard in place of or in addition to the communication ports 254, 255, 256, 257, 258, and 259.

Next described is a broadcast operation on the multi-layer full mesh system.

A plurality of processes belonging to the same job sometimes performs collective communication in which the multiple processes participate in data transmission all together. A user program invokes an MPI collective communication command, thereby initiating concurrent data transmission. A broadcast operation is one type of collective communication. In the broadcast operation, data of a particular process, e.g. a process with a rank of 0 (hereinafter sometimes referred to as "rank-0 process" for convenience, and similar notations are used for other processes), is copied to all other processes. Given one node being assigned one process, the broadcast operation is deemed as copying data from one server (node) to all other servers (nodes). A binomial tree algorithm is one type of broadcast operation algorithm.

Figure 6:
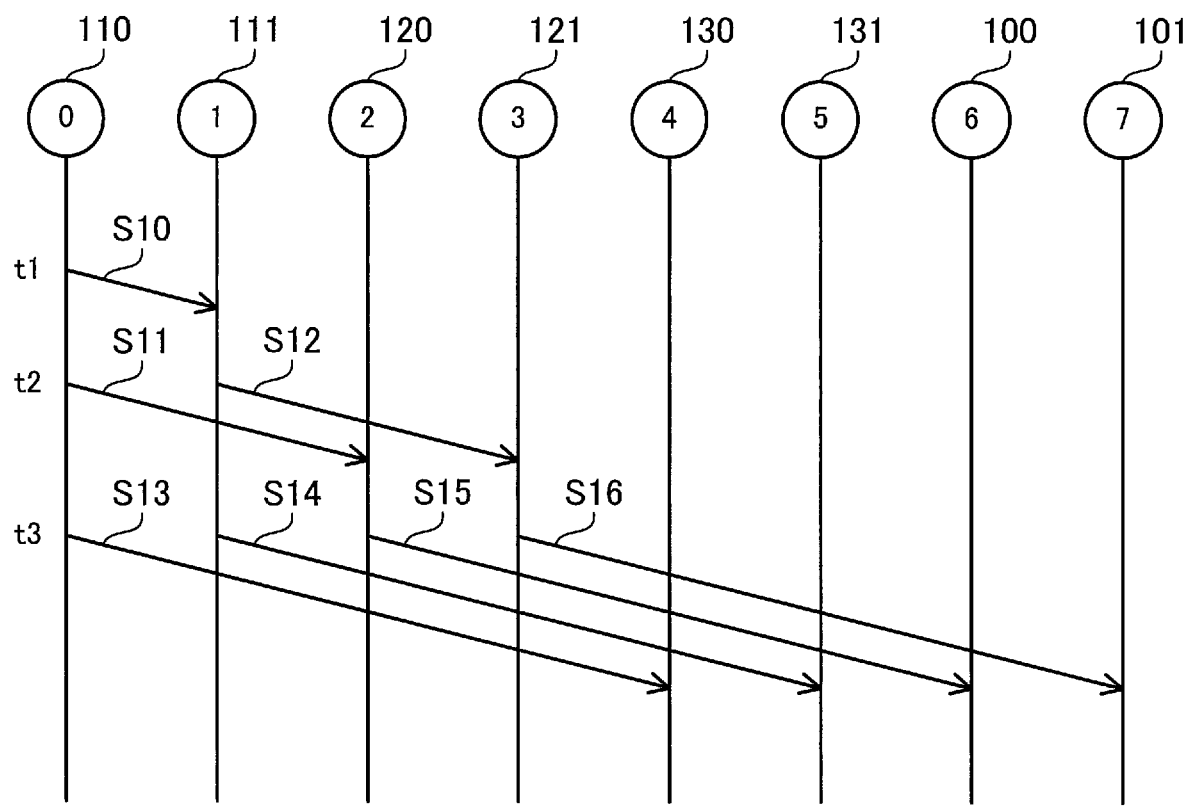
FIG. 6 is a sequence diagram illustrating an exemplary binomial tree algorithm.

FIG. 6 is a sequence diagram illustrating an exemplary binomial tree algorithm.

Assume here that the server 110 executes the rank-0 process; the server 111 executes a rank-1 process; the server 120 executes a rank-2 process; and the server 121 executes a rank-3 process. Also assume that the server 130 executes a rank-4 process; the server 131 executes a rank-5 process; the server 100 executes a rank-6 process; and the server 101 executes a rank-7 process. Assume also that the rank-0 process passes the same data to the processes with ranks of 1, 2, 3, 4, 5, 6, and 7.

In the binomial tree algorithm, a server receiving data in one phase acts as a source of the data in the next and subsequent phases. Herewith, the number of servers holding the same data increases by a power of 2 in every phase.

In Phase t1, the server 110 transmits data to the server 111 (step S10). Herewith, the servers 110 and 111 hold the same data. In Phase t2, the server 110 transmits the data to the server 120 (step S11), in parallel with which the server 111 transmits the received data to the server 121 (step S12). Herewith, the servers 110, 111, 120, and 121 hold the same data. In Phase t3, the server 110 transmits the data to the server 130 (step S13), in parallel with which the server 111 transmits the received data to the server 131 (step S14), further in parallel with which the server 120 transmits the received data to the server 100 (step S15), still further in parallel with which the server 121 transmits the received data to the server 101 (step S16).

The number of phases in the binomial tree algorithm is $O(\log_2 N)$ where N is the number of processes participating in the broadcast operation. Specifically, a phase count n is a natural number satisfying $2^{n-1} < N \leq 2^n$. For example, if the process count N is 8 (N=8), the phase count n is 3 (n=3). If the process count N is 36 (N=36), the phase count n is 6 (n=6). If the process count N is 80 (N=80), the phase count n is 7 (n=7).

Note, however, that a plain binomial tree algorithm increases the parallelism of data communication as the phases progress. Therefore, depending on the layout of the processes, there is an increased chance of causing data communication conflicts. The case where, in a single phase, two data sets are communicated using the same link in the same direction is considered as an occurrence of a data communication conflict (or collision). The data communication conflict is likely to cause a communication delay due to an occurrence of packets awaiting transmission, division of the communication band of one link and the like, which results in increased communication time.

Figure 7:
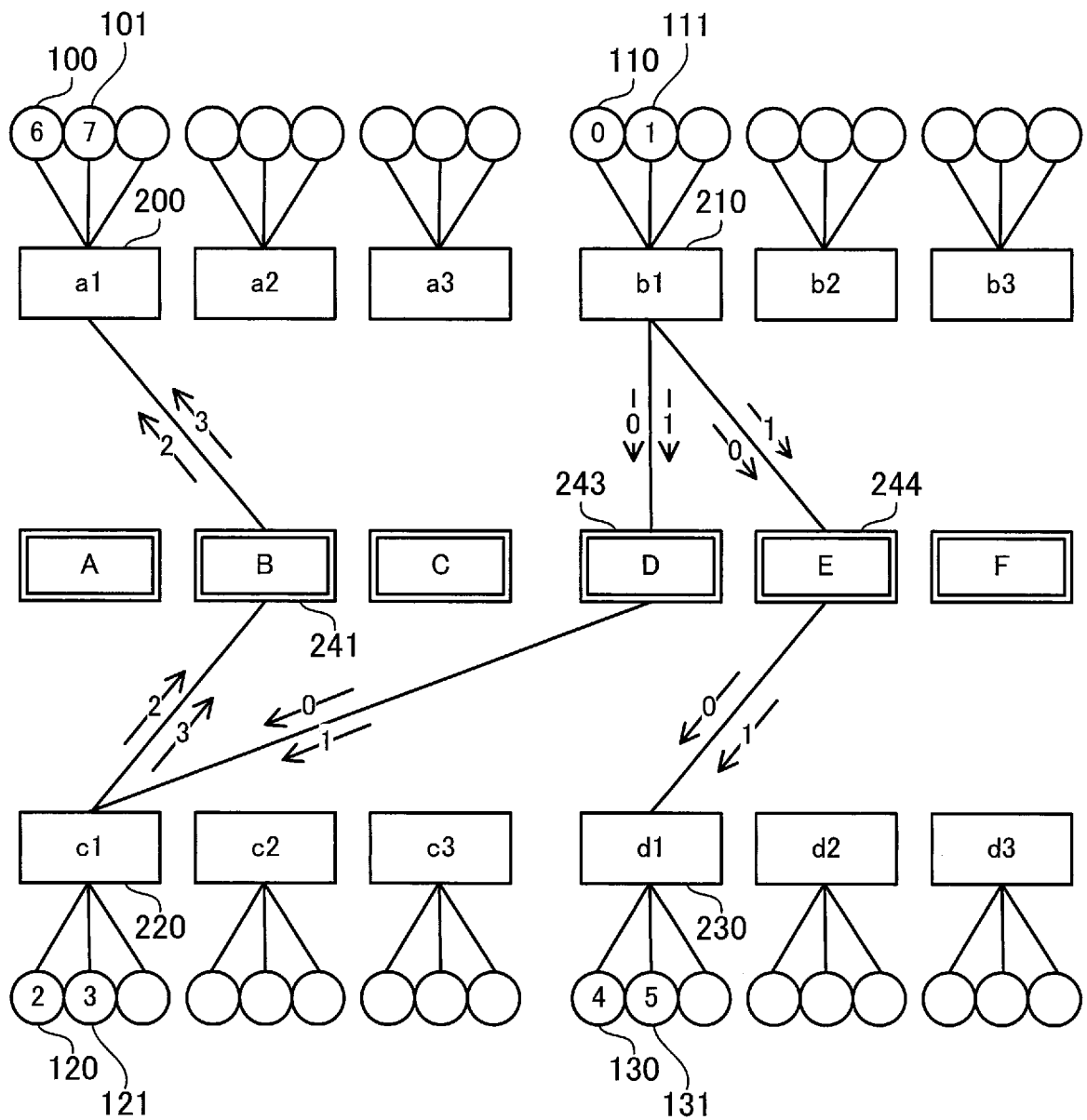
FIG. 7 illustrates exemplary conflicts in a broadcast operation.

FIG. 7 illustrates exemplary conflicts in a broadcast operation.

In Phase t2 described above, the server 110 transmits data to the server 120, and the server 111 transmits data to the server 121. Both the shortest path from the server 110 to the server 120 and that from the server 111 to the server 121 pass sequentially through the leaf switch 210, the spine switch 243, and the leaf switch 220, thus causing a communication conflict.

In addition, in Phase t3, the server 110 transmits data to the server 130, and the server 111 transmits data to the server 131. Both the shortest path from the server 110 to the server 130 and that from the server 111 to the server 131 pass sequentially through the leaf switch 210, the spine switch 244, and the leaf switch 230, thus causing a communication conflict.

Further, in Phase t3, the server 120 transmits data to the server 100, and the server 121 transmits data to the server 101. Both the shortest path from the server 120 to the server 100 and that from the server 121 to the server 101 pass sequentially through the leaf switch 220, the spine switch 241, and the leaf switch 200, thus causing a communication conflict.

In view of the above, the multi-layer full mesh system according to the second embodiment determines a broadcast operation procedure such that no communication conflicts occur. Specifically, one representative process is selected from each group, and a binomial tree algorithm composed of the selected representative processes is implemented. Subsequently, after data is copied to the representative processes of the individual groups, a binomial tree algorithm is implemented for each of the groups, in which the representative process of the group serves as a starting point. Next described is a broadcast operation procedure according to the second embodiment.

Figure 8:
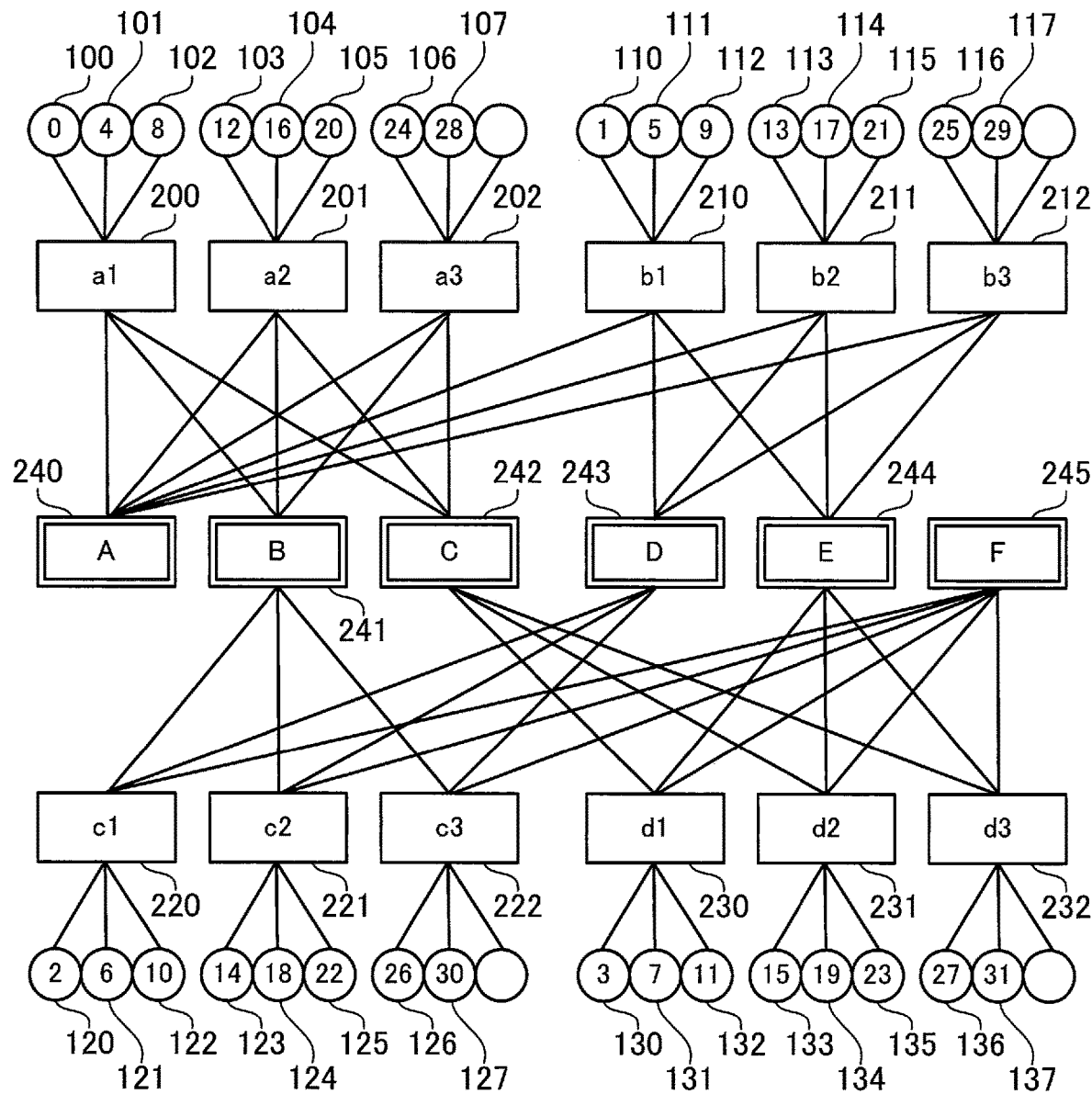
FIG. 8 illustrates exemplary process assignment.

FIG. 8 illustrates exemplary process assignment.

The following explains the broadcast operation procedure according to the second embodiment, assuming that thirty-two processes are assigned to thirty-two servers out of thirty-six servers. Four groups are assigned eight processes each out of the thirty-two processes.

Here, the processes with ranks of 0, 4, 8, 12, 16, 20, 24, and 28 are assigned to the servers 100, 101, 102, 103, 104, 105, 106, and 107 of Group a. The processes with ranks of 1, 5, 9, 13, 17, 21, 25, and 29 are assigned to the servers 110, 111, 112, 113, 114, 115, 116, and 117 of Group b. The processes with ranks of 2, 6, 10, 14, 18, 22, 26, and 30 are assigned to the servers 120, 121, 122, 123, 124, 125, 126, and 127 of Group c. The processes with ranks of 3, 7, 11, 15, 19, 23, 27, and 31 are assigned to the servers 130, 131, 132, 133, 134, 135, 136, and 137 of Group d.

Figure 9:
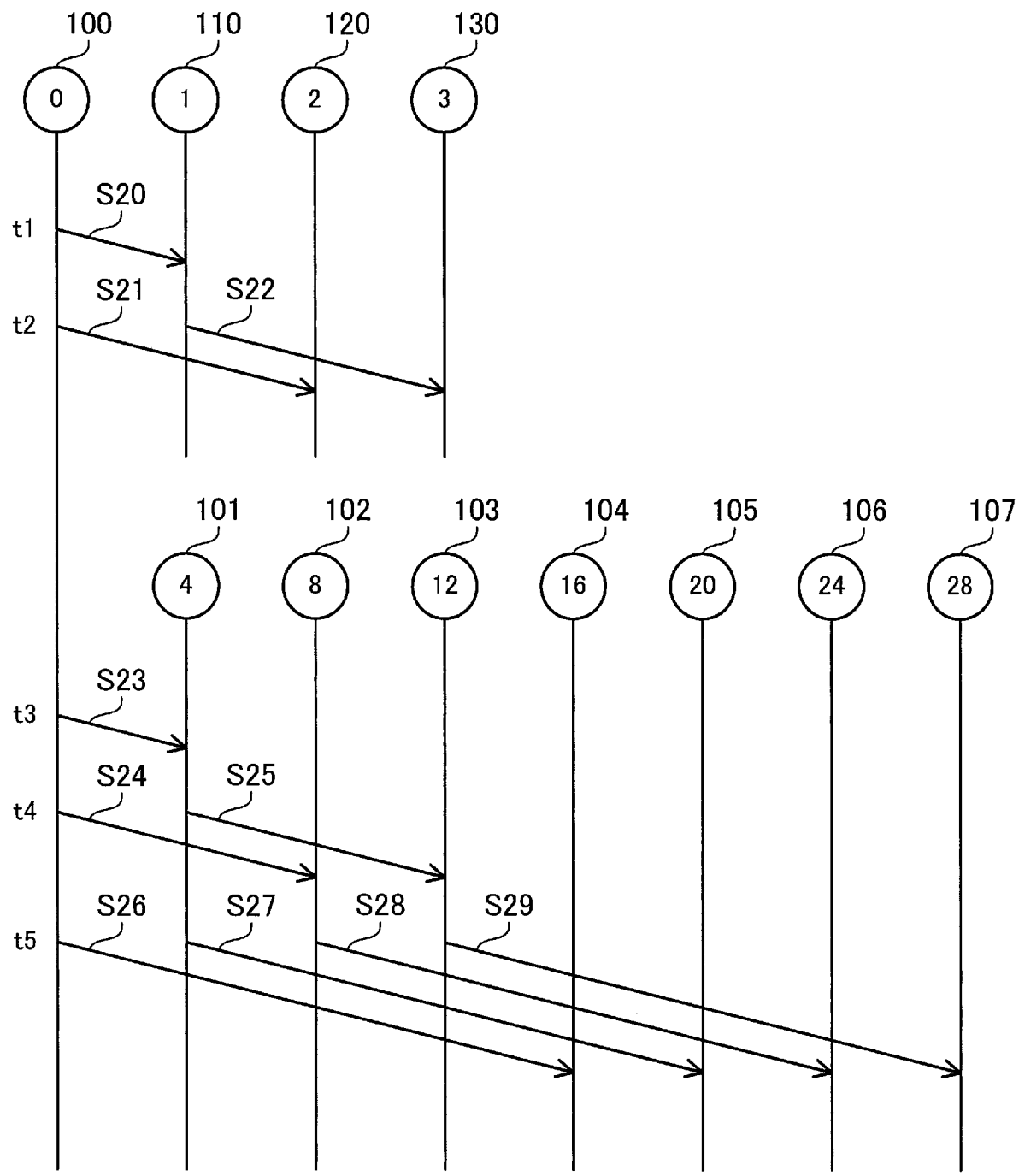
FIG. 9 is a sequence diagram illustrating an exemplary two-tiered broadcast operation.

FIG. 9 is a sequence diagram illustrating an exemplary two-tiered broadcast operation.

First, a representative process is selected from each of Groups a, b, c, and d. The representative process of each group is, for example, a process with the lowest rank in the group. Here, the rank-0 process is selected from Group a; the rank-1 process is selected from Group b; the rank-2 is selected from Group c; and the rank-3 is selected from Group d. Note however that a different criterion may be adopted to select representative processes. Note that these four processes are located on the same layer; however, the representative processes may belong to different layers.

Once the representative processes are selected, first, a binomial tree algorithm composed of the representative processes is implemented. In the case of broadcasting data of the rank-0 process, the server 100 transmits the data to the server 110 in Phase t1 (step S20). In Phase t2, the server 100 transmits the data to the server 120 (step S21), in parallel with which the server 110 transmits the received data to the server 130 (step S22). Herewith, the servers 100, 110, 120, and 130 assigned the representative processes hold the same data.

Once the data copying between the representative processes is complete, a binomial tree algorithm is implemented for each of Groups a, b, c, and d. Here, a communication procedure of Group a is described. In parallel with Group a, similar communication is performed in Groups b, c, and d.

In Phase t3, the server 100 transmits the data to the server 101 (step S23). In Phase t4, the server 100 transmits the data to the server 102 (step S24), in parallel with which the server 101 transmits the received data to the server 103 (step S25). In Phase t5, the server 100 transmits the data to the server 104 (step S26), in parallel with which the server 101 transmits the received data to the server 105 (step S27). Further in parallel, the server 102 transmits the received data to the server 106 (step S28), in parallel with which the server 103 transmits the received data to the server 107 (step S29). Herewith, the servers 100, 101, 102, 103, 104, 105, 106, and 107 hold the same data.

Next described are communication paths for intergroup communication and intragroup communication.

Figure 10:
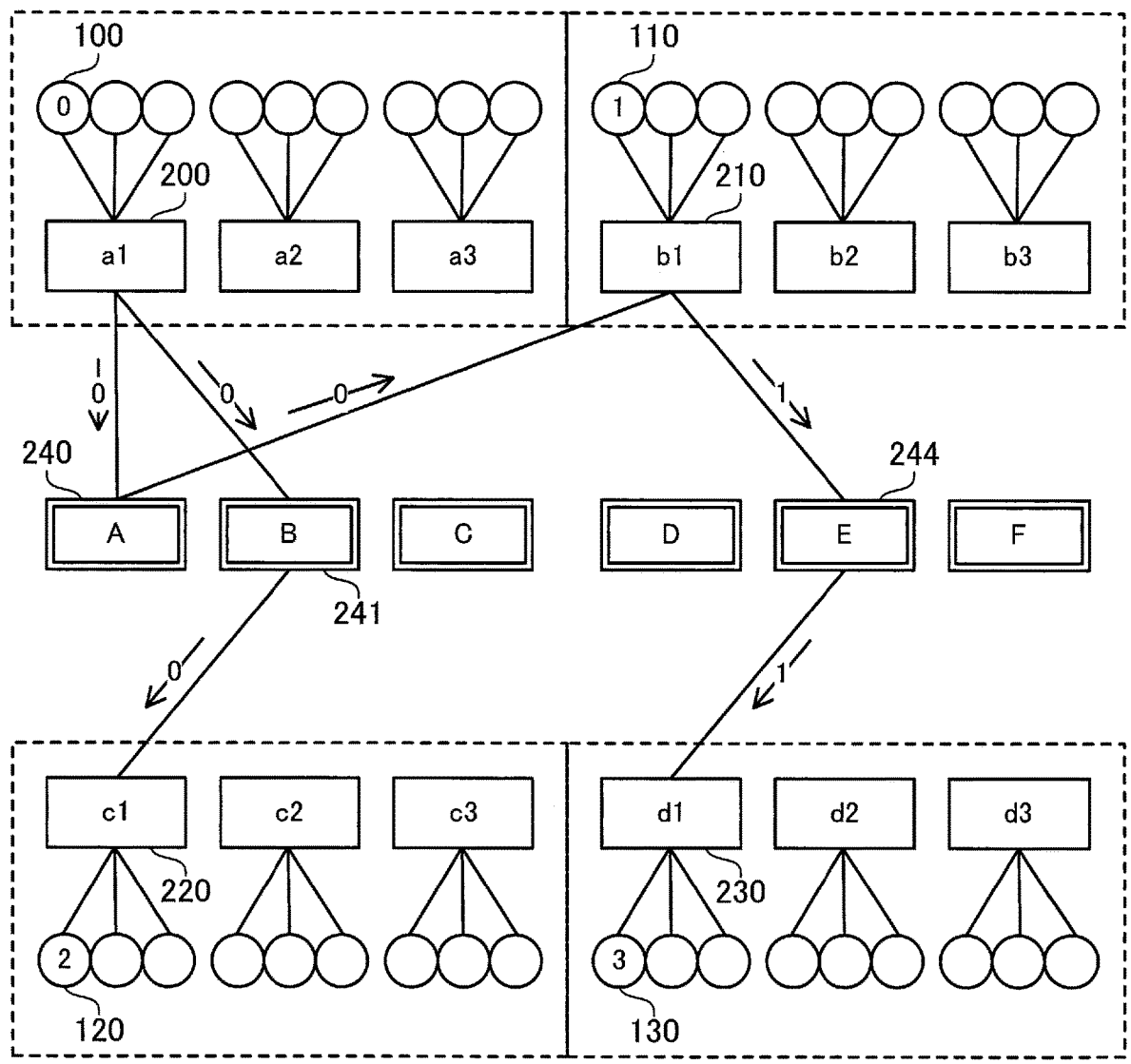
FIG. 10 illustrates exemplary conflict avoidance in inter-group communication.

FIG. 10 illustrates exemplary conflict avoidance in intergroup communication.

In step S20 of Phase t1 above, data is transmitted from the server 100 to the server 110 through the leaf switch 200, the spine switch 240, and the leaf switch 210. In step S21 of Phase t2 above, data is transmitted from the server 100 to the server 120 through the leaf switch 200, the spine switch 241, and the leaf switch 220. In step S22 of Phase t2 above, data is transmitted from the server 110 to the server 130 through the leaf switch 210, the spine switch 244, and the leaf switch 230.

As described above, conflicts in the intergroup communication are avoided by selecting a representative process from each group and allowing only servers assigned the representative processes to carry out communication. This is because full-mesh communication paths exist between leaf switches belonging to different groups. Because of the full-mesh communication paths, communication paths between Group a and Group c do not share links with communication paths between Group b and Group d. This holds true when the servers assigned the representative processes belong to different layers.

Figure 11:
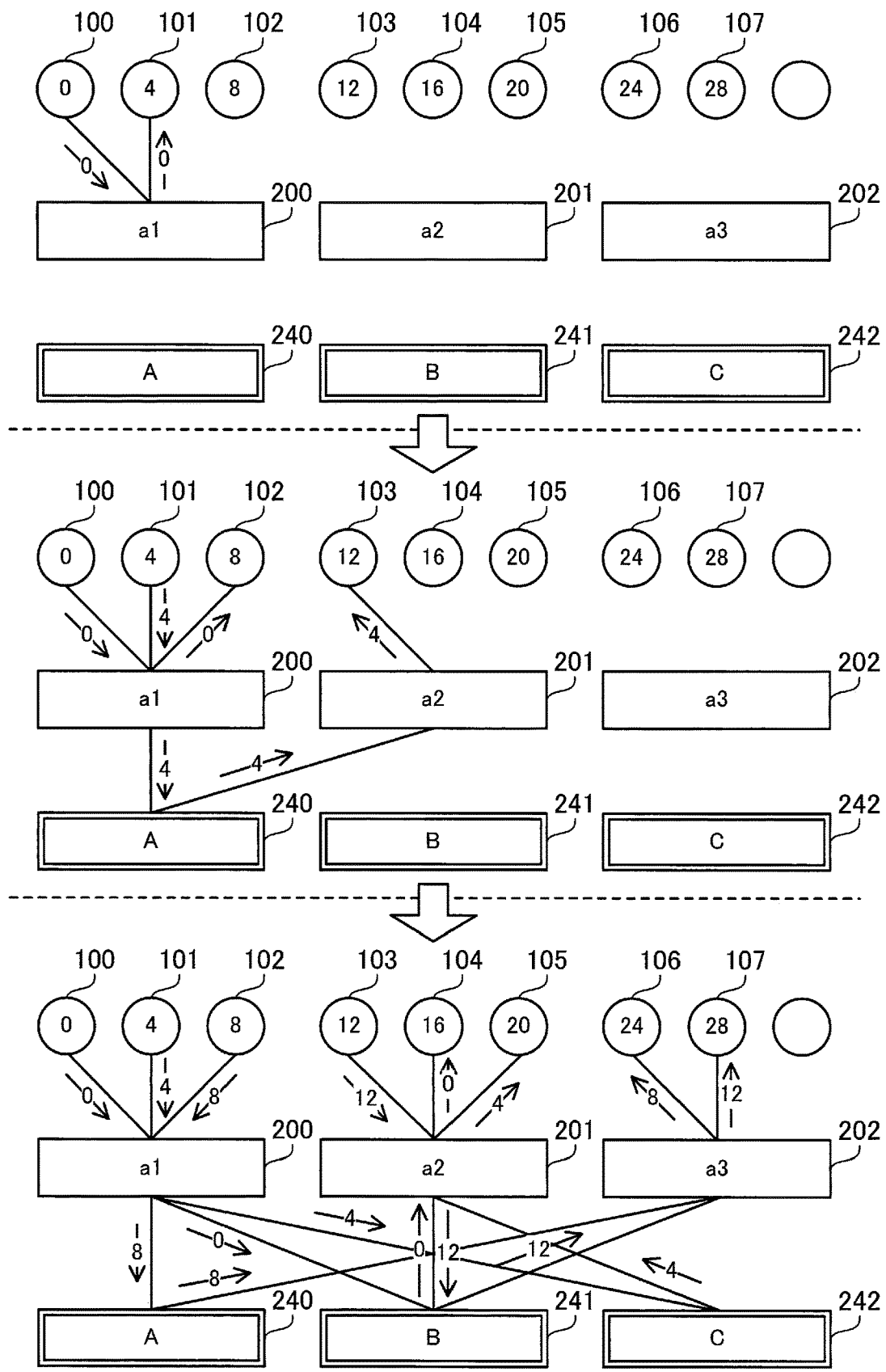
FIG. 11 illustrates exemplary conflict avoidance in intra-group communication.

FIG. 11 illustrates exemplary conflict avoidance in intragroup communication.

In step S23 of Phase t3 above, data is transmitted from the server 100 to the server 101 through the leaf switch 200.

In step S24 of Phase t4 above, data is transmitted from the server 100 to the server 102 through the leaf switch 200. In step S25 of Phase t4 above, data is transmitted from the server 101 to the server 103 through the leaf switch 200, the spine switch 240, and the leaf switch 201.

In step S26 of Phase t5 above, data is transmitted from the server 100 to the server 104 through the leaf switch 200, the spine switch 241, and the leaf switch 201. In step S27 of Phase t5 above, data is transmitted from the server 101 to the server 105 through the leaf switch 200, the spine switch 242, and the leaf switch 201. In step S28 of Phase t5 above, data is transmitted from the server 102 to the server 106 through the leaf switch 200, the spine switch 240, and the leaf switch 202. In step S29 of Phase t5 above, data is transmitted from the server 103 to the server 107 through the leaf switch 201, the spine switch 241, and the leaf switch 202.

Note that FIG. 11 represents data communication within Group a; however, data communication within each of Groups b, c, and d is performed in a similar fashion. Note however that Group b uses the spine switches 240, 243, and 244 as higher-level switches. Group c uses the spine switches 241, 243, and 245 as higher-level switches. Group d uses the spine switches 242, 244, and 245 as higher-level switches.

As described above, no conflicts occur in the intragroup communication. This is because the intragroup network corresponds to a fat tree topology. The fat tree topology is a network topology for relieving traffic congestion by multiplexing higher-level communication devices included in a tree topology to thereby multiplex communication paths between different lower-level communication devices.

In the multi-layer full mesh system according to the second embodiment, the number of links that each of three leaf switches has on the spine switch side is three, which is the same as the number of links on the server side. In addition, each leaf switch has three communication paths to reach a different leaf switch. That is, the total number of communication paths between three leaf switches and three spine switches is nine, which is the same as the number of servers connected to three leaf switches. Therefore, by assigning one of the communication paths between the leaf switches and the spine switches to each server, nine servers are able to perform data communication without conflicts.

Next described are functions of severs and a job scheduler.

Figure 12:
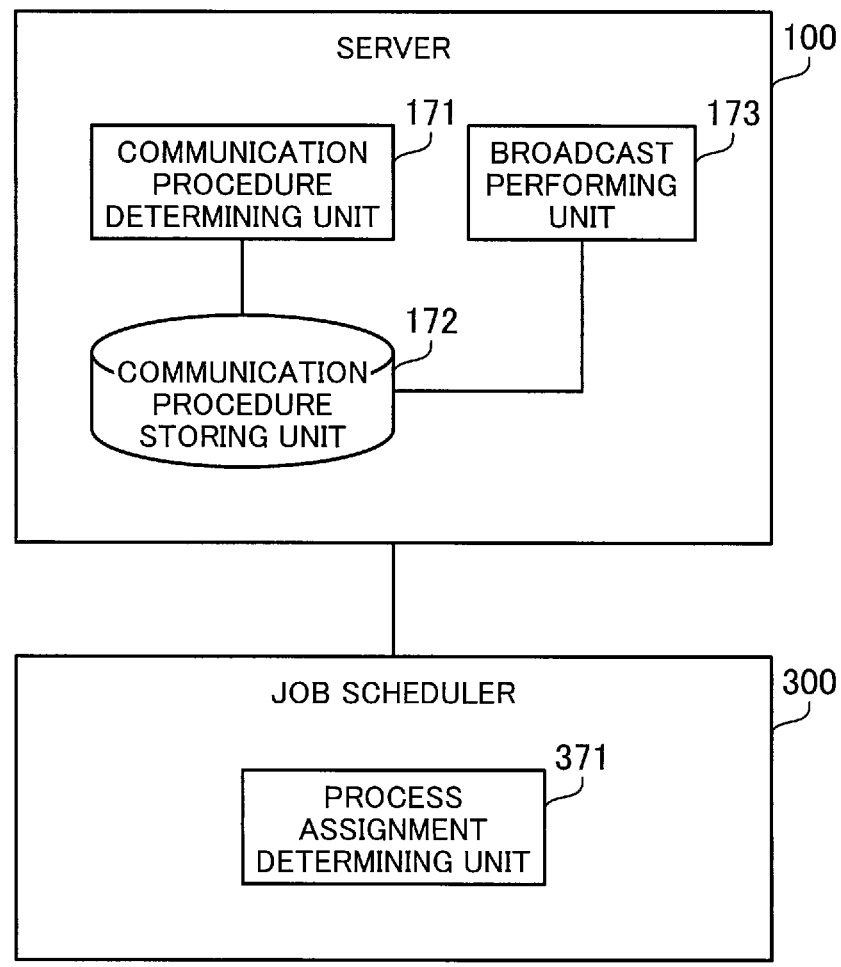
FIG. 12 illustrates exemplary functional components of a server and a job scheduler.

FIG. 12 illustrates exemplary functional components of a server and a job scheduler.

The server 100 includes a communication procedure determining unit 171, a communication procedure storing unit 172, and a broadcast performing unit 173. The communication procedure storing unit 172 is implemented using a storage area secured, for example, in the RAM 152 or the HD 153. The communication procedure determining unit 171 and the broadcast performing unit 173 are implemented, for example, using programs executed by the CPU 151. Note that other servers also individually have the same modules as those found in the server 100.

The communication procedure determining unit 171 receives, from the job scheduler 300, process assignment information indicating assignment of a plurality of processes belonging to a job. The process assignment information maps, for example, ranks of the processes to node identifiers (IDs) of servers individually assigned the processes. Based on the received process assignment information, the communication procedure determining unit 171 determines a communication procedure among the multiple processes in a broadcast operation. The communication procedure determining unit 171 generates communication procedure information indicating the determined communication procedure and then stores it in the communication procedure storing unit 172.

The communication procedure of a broadcast operation is determined at the time of initialization of a communication library, such as MPI. User programs using the communication library are located in a plurality of servers, and when they are run on the servers, the communication library is initialized. At the initialization of the communication library, communication may be performed between the servers. The process assignment information used to determine the communication procedure may be collected via interserver communication, instead of receiving it from the job scheduler 300. In addition, the communication procedure of the broadcast operation may be determined when a request for a broadcast operation is first made from the user program, instead of when the communication library is initialized.

The communication procedure determined here is a communication procedure of a broadcast operation having the rank-0 process as a starting point. In the case of broadcasting data of a process other than the rank-0 process, the data may be sent to the rank-0 process. Note however that it is also possible to determine the communication procedure of a broadcast operation using a process other than the rank-0 process as a starting point. In addition, the communication procedure information generated by the communication procedure determining unit 171 indicates a communication procedure among all the processes included in the job. Using the same process assignment information and the same broadcast operation algorithm, the servers generate the same communication procedure information. Note however that the communication procedure information generated may be simplified to indicate only a communication procedure of the server 100.

The communication procedure storing unit 172 stores therein the communication procedure information generated by the communication procedure determining unit 171. The communication procedure information indicates, for each phase of the broadcast operation, the rank of each destination process to which data is transmitted and the rank of each source process from which data is received.

When the user program invokes a command to start a broadcast operation, the broadcast performing unit 173 performs a broadcast operation based on the communication procedure information stored in the communication procedure storing unit 172. The broadcast performing unit 173 carries out one by one a plurality of phases indicated by the communication procedure information. In the case where a source process is designated for a phase, the broadcast performing unit 173 receives data from the source process. In the case where a destination process is designated for a phase, the broadcast performing unit 173 copies data held therein and transmits the copy to the destination process.

In data transmission, the broadcast performing unit 173 generates packets including the address of a server assigned a destination process and a data body, and then outputs the packets to the leaf switch 200 via the HCA 157. The address of a server assigned each process is obtained at the time of initialization of the communication library.

The job scheduler 300 includes a process assignment determining unit 371. The process assignment determining unit 371 is implemented, for example, using a program executed by a CPU.

The process assignment determining unit 371 receives a job request from the user and determines assignment of a plurality of processes included in a job in response to the received job request. The number of processes to be run is designated by the job request from the user. The process assignment determining unit 371 determines assignment of the processes such that, for example, the multiple processes belonging to the same job are assigned as equally as possible to Groups a, b, c, and d. The process assignment determining unit 371 transmits process assignment information, which indicates the determined process assignment, to a plurality of servers used for the job.

FIG. 13 illustrates an exemplary process assignment table.

A process assignment table 174 represents the process assignment information that the communication procedure determining unit 171 receives from the job scheduler 300. The process assignment table 174 maps ranks to node IDs. The ranks are non-negative integer identification numbers used to identify a plurality of processes included in a job. The node IDs are identifiers used to identify servers each assigned a process. The node IDs may also serve as communication addresses indicating destinations of packets.

FIG. 14 illustrates exemplary communication procedure tables.

A transmission procedure table 175 and a reception procedure table 176 are generated by the communication procedure determining unit 171 and then stored in the communication procedure storing unit 172.

The transmission procedure table 175 registers, for each pair of a phase and a rank, the rank of a destination process to which a process with the paired rank transmits data in the paired phase. Note that if no destination process exists, that is, if the process with the paired rank does not perform data transmission in the paired phase, a predetermined numerical value (e.g. −1) not used for ranks is registered. In the case where the rank-0 process transmits data to the rank-1 process in Phase t1, for example, "1" is registered for the paired Phase t1 and rank of 0.

The reception procedure table 176 registers, for each pair of a phase and a rank, the rank of a source process from which a process with the paired rank receives data in the paired phase. Note that if no source process exists, that is, if the process with the paired rank does not perform data reception, a predetermined numerical value (e.g. −1) not used for ranks is registered. In the case where the rank-1 process receives data from the rank-0 process in Phase t1, for example, "0" is registered for the paired Phase t1 and rank of 1.

In the case of performing a broadcast operation, each server simply reads, from each of the transmission procedure table 175 and the reception procedure table 176, a row corresponding to the rank of a process assigned to the server, and refers to numerical values included in the read row sequentially from left to right.

Next described is a processing procedure of the server 100.

Figure 15:
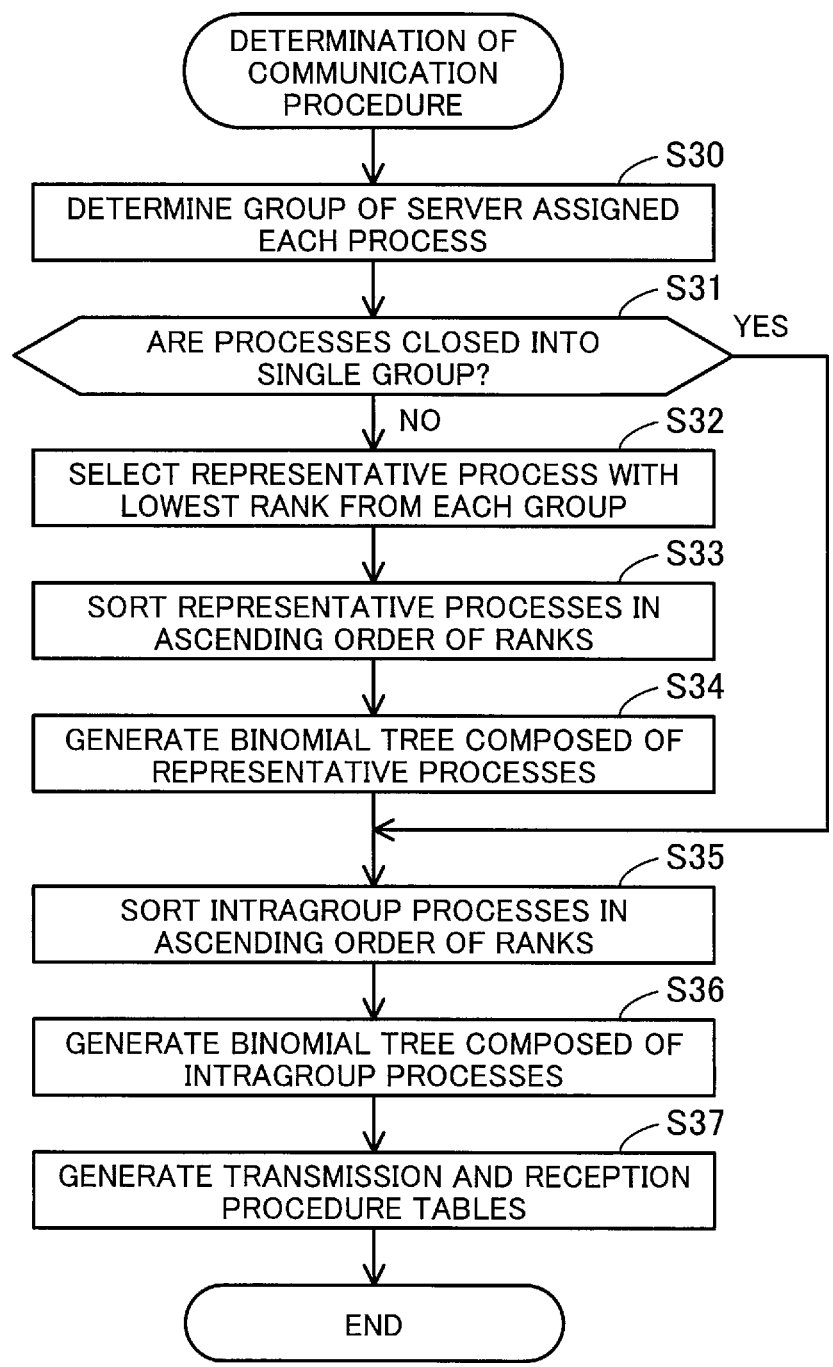
FIG. 15 is a flowchart illustrating exemplary processing for determining a communication procedure.

FIG. 15 is a flowchart illustrating exemplary processing for determining a communication procedure.

(Step S30) The communication procedure determining unit 171 identifies servers (nodes) each assigned one of a plurality of processes included in a job concerned, and determines a group to which each of the identified servers belongs. Each group is formed of a plurality of leaf switches connected to the same set of spine switches and a plurality of servers connected to the multiple leaf switches.

The multi-layer full mesh system according to the second embodiment includes Groups a, b, c, and d. In the example of FIG. 2, Group a includes leaf switches and servers located at the upper left of each of the square layers 41, 42, and 43. Group b includes leaf switches and servers located at the lower left of each of the square layers 41, 42, and 43. Group c includes leaf switches and servers located at the lower right of each of the square layers 41, 42, and 43. Group d includes leaf switches and servers located at the upper right of each of the square layers 41, 42, and 43. Note that the communication procedure determining unit 171 preliminarily knows the topology of the multi-layer full mesh system, that is, the definition of the groups included in the multi-layer full mesh system.

(Step S31) The communication procedure determining unit 171 determines whether a plurality of processes included in the job is closed into a single group, that is, a plurality of servers participating in the broadcast operation belongs all to the same group. If the multiple processes are closed into a single group, the processing moves to step S35. If not, the processing moves to step S32.

(Step S32) The communication procedure determining unit 171 selects, for each group, a process with the lowest rank from among processes assigned to the group as a representative process. Note that another selection criterion may be adopted as long as one representative process is selected for each group. However, a process serving as a starting point, like the rank-0 process, needs to be selected.

(Step S33) The communication procedure determining unit 171 sorts the representative processes corresponding to the multiple groups, selected in step S32, in ascending order of ranks (i.e., from lower to higher ranks). Note that the representative processes need not be in ascending order of ranks as long as they are arranged in certain order. However, a process serving as a starting point, like the rank-0 process, needs to be first in the sorted sequence.

(Step S34) The communication procedure determining unit 171 generates a binomial tree composed of the sorted multiple representative processes. According to the binomial tree algorithm, in the case where the representative processes have been sorted in ascending order of ranks, representative processes with lower ranks preferentially receive data. The number of representative processes having received data progressively increases by a power of 2. According to the binomial tree, the communication procedure determining unit 171 determines a communication procedure among the representative processes, up to the point where all the representative processes receive a copy of the data.

(Step S35) For each of the one or more groups used for the job, the communication procedure determining unit 171 sorts processes assigned to the group in ascending order of ranks (i.e., from lower to higher ranks). Note that the processes of the group need not be in ascending order of ranks as long as they are arranged in certain order. However, the representative process selected for the group in step S32 needs to be first in the sorted sequence.

(Step S36) For each of the one or more groups, the communication procedure determining unit 171 generates a binomial tree composed of the sorted processes of the group. In the case where the processes have been sorted in ascending order of ranks, the representative process starts data communication and processes with lower ranks within the group preferentially receive data. The number of processes having received data progressively increases by a power of 2. According to the binomial tree, the communication procedure determining unit 171 determines a communication procedure among the processes, up to the point where all the processes of the group receive a copy of the data.

(Step S37) The communication procedure determining unit 171 joins the intergroup communication procedure determined in step S34 and the intragroup communication procedure determined in step S36 in the stated order (i.e., the intergroup communication precedes the intragroup communication), to thereby determine a whole communication procedure up to the point where data held by the starting-point process is copied to all the other processes. The communication procedure determining unit 171 generates, based on the determined whole communication procedure, the transmission procedure table 175 and the reception procedure table 176 and then stores these tables in the communication procedure storing unit 172.

Figure 16:
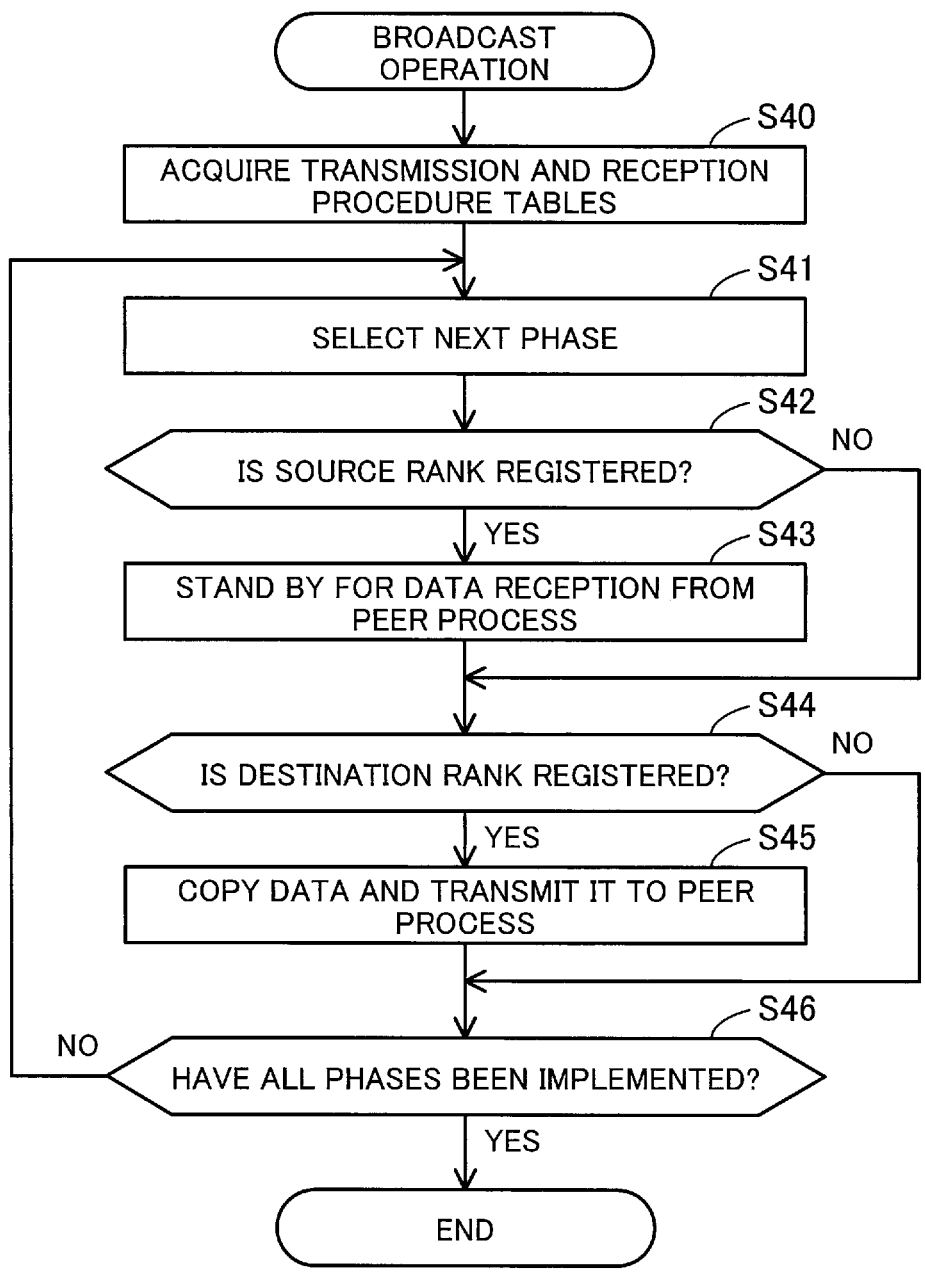
FIG. 16 is a flowchart illustrating exemplary processing of a broadcast operation.

FIG. 16 is a flowchart illustrating exemplary processing of a broadcast operation.

(Step S40) Upon receiving a request for a broadcast operation from a user program, the broadcast performing unit 173 acquires the transmission procedure table 175 and the reception procedure table 176.

(Step S41) The broadcast performing unit 173 preferentially selects, as the next phase, a phase with the lowest phase number from among phases yet to be implemented. In the beginning, Phase t1 is selected.

(Step S42) The broadcast performing unit 173 reads, from the reception procedure table 176, a numerical value corresponding to a pair of the phase selected in step S41 and the rank of a process assigned to the server 100. The broadcast performing unit 173 determines whether the read value represents a source rank, that is, whether an appropriate source rank is registered in the reception procedure table 176. The read value being "−1" means that no source rank is registered. If a source rank is registered, the processing moves to step S43. If not, the processing moves to step S44.

(Step S43) The broadcast performing unit 173 stands by for receiving data from a peer process indicated by the source rank and receives the data. For example, the broadcast performing unit 173 periodically checks a receive buffer corresponding to the peer process, and retrieves data from the receive buffer if the data has arrived. The data reception may be performed in parallel with steps S44 and S45 and only needs to be performed by no later than step S46. The broadcast performing unit 173 retains the received data.

(Step S44) The broadcast performing unit 173 reads, from the transmission procedure table 175, a numerical value corresponding to the pair of the phase selected in step S41 and the rank of a process assigned to the server 100. The broadcast performing unit 173 determines whether the read value represents a destination rank, that is, whether an appropriate destination rank is registered in the transmission procedure table 175. The read value being "−1" means that no destination rank is registered. If a destination rank is registered, the processing moves to step S45. If not, the processing moves to step S46.

(Step S45) The broadcast performing unit 173 transmits a copy of data held therein to a peer process indicated by the destination rank. The transmission data is divided into packets, each of which is given an address of a server assigned the peer process. The data held by the broadcast performing unit 173 is original data when the process assigned to the server 100 is the starting-point process. When the process assigned to the server 100 is not the starting-point process, the data held by the broadcast performing unit 173 has been received from a different server by the previous phase.

(Step S46) The broadcast performing unit 173 determines whether implementation of all phases defined in the transmission procedure table 175 and the reception procedure table 176 is completed. If the implementation of all the phases is completed, the broadcast operation ends. On the other hand, if there is a phase yet to be implemented, the processing moves to step S41.

Next described is the phase count of a broadcast operation according to the second embodiment. The phase count of a plain binomial tree algorithm is six in the case of 36 processes and seven in the case of 80 processes. On the other hand, according to the second embodiment, the minimum phase count of the intergroup communication is two and the minimum phase count of the intragroup communication is four in the case of 36 processes, thus totaling to six phases. In the case of 80 processes, the minimum phase count of the intergroup communication is three and the minimum phase count of the intragroup communication is four, thus totaling to seven phases.

When the process count varies less from group to group, a broadcast operation according to the second embodiment is performed with the same or a similar number of phases as the plain binomial tree algorithm. In terms of the efficiency of the broadcast operation, it is preferred that the job scheduler 300 assign processes as equally as possible to a plurality of groups.

Note that, according to the second embodiment, each group is formed of a plurality of leaf switches connected to the same set of spine switches and servers subordinate to the multiple leaf switches. Alternatively, each group may be formed of one leaf switch and servers subordinate to the single leaf switch.

In this case, one representative process is selected for each leaf switch. For intergroup communication, one binomial tree is composed of the multiple representative processes corresponding to the multiple leaf switches. For intragroup communication, one binomial tree is composed of a plurality of processes subordinate to each leaf switch. In the multi-layer full mesh system of FIGS. 2 and 3, for example, twelve groups would be formed. Grouping servers in this way does not cause communication conflicts in the intergroup communication between the multiple leaf switches. In addition, no communication conflicts occur in the intragroup communication under each leaf switch.

According to the second embodiment, the broadcast operation is carried out in two stages; however, it may be performed in three stages by hierarchizing groups. Each major group is formed of a plurality of leaf switches connected to the same set of spine switches and servers subordinate to the multiple leaf switches. In addition, each minor group is formed of one leaf switch and servers subordinate to the single leaf switch.

In this case, a higher-level representative process is selected for each major group, and further, a lower-level representative process is selected for each leaf switch. In the first stage, one binomial tree is generated which is composed of a plurality of higher-level representative processes corresponding to the multiple major groups. In the second stage, one binomial tree is generated which is composed of a plurality of lower-level representative processes corresponding to the multiple leaf switches. In the third stage, one binomial tree is generated which is composed of a plurality of processes subordinate to each leaf switch. In the multi-layer full mesh system of FIGS. 2 and 3, for example, four major groups and twelve minor groups would be formed. When there are a large number of servers, this leaf switch-based grouping proves useful.

The multi-layer full mesh system according to the second embodiment adopts a multi-layer full mesh topology. Compared to a plain tree topology, the multi-layer full mesh topology offers redundancy of higher-level communication devices, thereby establishing redundancy in communication paths between lower-level communication devices. This relieves traffic congestion. When compared to a simple fat tree topology, the multi-layer full mesh topology enables a reduction in the number of communication devices, which results in reduced cost of system building. In addition, the multi-layer full mesh system of the second embodiment carries out a broadcast operation according to each binomial tree such that the number of nodes having data copied thereto increases by a power of 2 each time the phase count is incremented by one. This allows a fast broadcast operation.

In addition, a plurality of leaf switches connected to the same set of spine switches and nodes subordinate to the leaf switches are put into the same group, and a representative node is selected from each group. Then, data transmission between the representative nodes is preferentially carried out, which is followed by data transmission within each group with its representative node set as a starting point. Because there is a full mesh of communication paths between the groups, no communication conflicts occur when the multiple nodes perform parallel communication if one node per group participates in the communication. In addition, the intragroup network topology corresponds to a fat tree. Therefore, under the condition of closed communication between nodes within each group, no communication conflicts occur when a plurality of nodes performs parallel communication. Taking control of communication conflicts results in control of communication delay, thereby shortening the time needed for the broadcast operation.

According to one aspect, it is possible to control communication conflicts in internode communication.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program that causes a computer to execute a process comprising:
   classifying, in a system including a plurality of nodes, a plurality of first relay devices, and a plurality of second relay devices, where each of the plurality of nodes is connected to one of the plurality of first relay devices and each of the plurality of first relay devices is connected to two or more second relay devices from among the plurality of second relay devices, the plurality of nodes into a plurality of groups such that different nodes individually connected to different first relay devices having different sets of the two or more second relay devices connected thereto are classified into different groups;
   selecting a representative node from each of the plurality of groups;
   determining communication order of a first broadcast operation performed between the representative nodes corresponding to the plurality of groups such that one of the representative nodes acts as a first source node and each remaining representative node other than the first source node after receiving data acts as a source node thereafter, to increase a number of source nodes transmitting the data in parallel; and
   determining, with respect to each of the plurality of groups, communication order of a second broadcast operation performed between two or more nodes included in the each of the plurality of groups after the first broadcast operation such that the representative node of the each of the plurality of groups acts as a first source node and each remaining node other than the first source node included in the each of the plurality of groups, after receiving the data, acts as a source node thereafter, to increase a number of source nodes transmitting the data in parallel.

2. The non-transitory computer-readable recording medium according to claim 1, wherein the classifying includes classifying, into a same group, different nodes individually connected to different first relay devices having a same set of the two or more second relay devices connected thereto.

3. The non-transitory computer-readable recording medium according to claim 1, wherein the representative node of the each of the plurality of groups is, among the two or more nodes included in the each of the plurality of groups, a node assigned a process having a lowest identification number.

4. The non-transitory computer-readable recording medium according to claim 1, wherein in each of the first broadcast operation and the second broadcast operation, a phase for transmitting the data in parallel to two or more nodes whose source nodes are different from each other is iteratively performed to double a number of nodes having received the data in each phase.

5. A communication control method comprising:
   classifying, by a processor, in a system including a plurality of nodes, a plurality of first relay devices, and a plurality of second relay devices, where each of the plurality of nodes is connected to one of the plurality of first relay devices and each of the plurality of first relay devices is connected to two or more second relay devices from among the plurality of second relay devices, the plurality of nodes into a plurality of groups such that different nodes individually connected to different first relay devices having different sets of the two or more second relay devices connected thereto are classified into different groups;

selecting, by the processor, a representative node from each of the plurality of groups;

determining, by the processor, communication order of a first broadcast operation performed between the representative nodes corresponding to the plurality of groups such that one of the representative nodes acts as a first source node and each remaining representative node other than the first source node after receiving data acts as a source node thereafter, to increase a number of source nodes transmitting the data in parallel; and determining, by the processor, with respect to each of the plurality of groups, communication order of a second broadcast operation performed between two or more nodes included in the each of the plurality of groups after the first broadcast operation such that the representative node of the each of the plurality of groups acts as a first source node and each remaining node other than the first source node included in the each of the plurality of groups, after receiving the data, acts as a source node thereafter, to increase a number of source nodes transmitting the data in parallel.

6. An information processing apparatus comprising:

a memory configured to store, in a system including a plurality of nodes, a plurality of first relay devices, and a plurality of second relay devices, where each of the plurality of nodes is connected to one of the plurality of first relay devices and each of the plurality of first relay devices is connected to two or more second relay devices from among the plurality of second relay devices, communication control data indicating communication order of a broadcast operation between the plurality of nodes; and a processor configured to determine the communication order of the broadcast operation and execute a process including:

classifying the plurality of nodes into a plurality of groups such that different nodes individually connected to different first relay devices having different sets of the two or more second relay devices connected thereto are classified into different groups, selecting a representative node from each of the plurality of groups, determining communication order of a first broadcast operation performed between the representative nodes corresponding to the plurality of groups such that one of the representative nodes acts as a first source node and each remaining representative node other than the first source node after receiving data acts as a source node thereafter, to increase a number of source nodes transmitting the data in parallel, and determining, with respect to each of the plurality of groups, communication order of a second broadcast operation performed between two or more nodes included in the each of the plurality of groups after the first broadcast operation such that the representative node of the each of the plurality of groups acts as a first source node and each remaining node other than the first source node included in the each of the plurality of groups, after receiving the data, acts as a source node thereafter, to increase a number of source nodes transmitting the data in parallel.

* * * * *